(12) United States Patent
Lee et al.

(10) Patent No.: US 10,011,746 B2
(45) Date of Patent: Jul. 3, 2018

(54) RADICAL CURABLE ADHESIVE COMPOSITION AND POLARIZING PLATE COMPRISING SAME

(71) Applicant: LG CHEM, LTD., Seoul (KR)

(72) Inventors: Mi Rin Lee, Daejeon (KR); Kwang Seung Park, Daejeon (KR); Jun Wuk Park, Daejeon (KR); Eunsoo Huh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 47 days.

(21) Appl. No.: 15/024,767

(22) PCT Filed: Sep. 19, 2014

(86) PCT No.: PCT/KR2014/008731
§ 371 (c)(1),
(2) Date: Mar. 24, 2016

(87) PCT Pub. No.: WO2015/046817
PCT Pub. Date: Apr. 2, 2015

(65) Prior Publication Data
US 2016/0244645 A1  Aug. 25, 2016

(30) Foreign Application Priority Data

Sep. 30, 2013 (KR) ......................... 10-2013-0117014
Sep. 16, 2014 (KR) ......................... 10-2014-0122426

(51) Int. Cl.
| | |
|---|---|
| C09J 4/00 | (2006.01) |
| G02B 1/14 | (2015.01) |
| C09J 133/14 | (2006.01) |
| C09J 133/10 | (2006.01) |
| G02B 5/30 | (2006.01) |

(52) U.S. Cl.
CPC ............... *C09J 133/14* (2013.01); *C09J 4/00* (2013.01); *C09J 133/10* (2013.01); *G02B 1/14* (2015.01); *G02B 5/3033* (2013.01)

(58) Field of Classification Search
CPC ........................................................ C09J 4/00
See application file for complete search history.

(56) References Cited

U.S. PATENT DOCUMENTS

| | | | |
|---|---|---|---|
| 5,194,550 A | | 3/1993 | Rance et al. |
| 5,234,972 A | * | 8/1993 | Saitoh ................... C07C 69/593 523/118 |
| 6,337,118 B1 | * | 1/2002 | Takehana ................. B32B 7/12 428/64.1 |
| 9,611,411 B2 | * | 4/2017 | Park ....................... C09J 133/14 |
| 2012/0320459 A1 | | 12/2012 | Akari et al. |
| 2014/0072731 A1 | | 3/2014 | Seo et al. |
| 2014/0160406 A1 | | 6/2014 | Huh et al. |
| 2015/0099127 A1 | * | 4/2015 | Ogawa ....................... C09J 4/00 428/414 |
| 2016/0083491 A1 | * | 3/2016 | Yao ........................... C08F 2/48 15/104.002 |

FOREIGN PATENT DOCUMENTS

| | | |
|---|---|---|
| JP | 61-266480 A | 11/1986 |
| JP | 2010-282161 A | 12/2010 |
| JP | 2013185133 A | 9/2013 |
| KR | 1020100100809 A | 9/2010 |
| KR | 101010574 B1 | 1/2011 |
| KR | 1020120117868 A | 10/2012 |
| KR | 1020130040725 A | 4/2013 |
| KR | 1020130103290 A | 9/2013 |
| WO | 2013-027980 A2 | 2/2013 |

OTHER PUBLICATIONS

Electrolube Technical Data Sheet of HPASP, downloaded Jun. 23, 2017.*

* cited by examiner

*Primary Examiner* — Vu A Nguyen
(74) *Attorney, Agent, or Firm* — Dentons US LLP

(57) ABSTRACT

The present invention relates to a radical-curable adhesive composition including a first compound represented by [Chemical Formula I]; a radical-curable second compound including at least one carboxyl group conjugated with a carbon-carbon unsaturated double bond present in the side chain in the molecule; and a radical initiator, and a polarizing plate including the radical-curable adhesive composition.

13 Claims, No Drawings

RADICAL CURABLE ADHESIVE COMPOSITION AND POLARIZING PLATE COMPRISING SAME

This application is a National Stage entry of International Application No. PCT/KR2014/008731, filed on Sep. 19, 2014, and claims priority to Korean Application Nos. 10-2013-0117014, filed Sep. 30, 2013 and 10-2014-0122426, filed Sep. 16, 2014, all of which are hereby incorporated by reference in their entireties as if fully set forth herein.

TECHNICAL FIELD

The present disclosure relates to a radical-curable adhesive composition and a polarizing plate including the same, and in particular, to a radical-curable adhesive composition having excellent adhesive strength and excellent heat resistance even under high humidity environments, and a polarizing plate including the same.

BACKGROUND ART

Polarizing plates having a structure in which a protective film is laminated on one or both surfaces of a polarizer formed with a polyvinyl alcohol (hereinafter, referred to 'PVA')-based resin dyed with dichroic dye or iodine using an adhesive have been commonly used. Triacetyl cellulose (TAC)-based films have been normally used as a polarizing plate protective film in the art, however, such TAC films have a problem of being readily deformed in high temperature and high humidity environments. Accordingly, protective films made of various materials capable of replacing TAC films have been recently developed, and for example, a method of using polyethylene terephthalate (PET), a cycloolefin polymer (COP), and an acryl-based film either alone or as a mixture thereof has been proposed.

Herein, aqueous adhesives formed with an aqueous solution of a polyvinyl alcohol-based resin are normally used as an adhesive used to attach the polarizer and the protective film. However, aqueous adhesives have a problem in that the use is limited depending on the material of a film, since adhesive strength is weak when acryl-based films or COP films and the like are used as the protective film instead of TAC. In addition to the problem of adhesive strength defects depending on the materials, the aqueous adhesive also has problems in that curls are generated in a polarizing plate due to a drying process of the aqueous adhesive, and initial optical properties are degraded when materials of the protective film used on both surfaces of a PVA element are different. Moreover, a drying process is absolutely required when the aqueous adhesive is used, and differences in moisture permeability, heat expansion and the like occur in the drying process leading to a problem of a defect rate increase. As an alternative to solve the problems described above, methods of using non-aqueous adhesives instead of aqueous adhesives have been proposed.

Non-aqueous adhesives for a polarizing plate that have been proposed so far may be divided into radical-curable adhesives and cation-curable adhesives depending on the types of curing. Cation-curable adhesives have an advantage in that excellent adhesive strength is obtained for films made of various materials, but have many disadvantages in the manufacturing process due to a low curing speed and a low degree of curing. Radical-curable adhesives having acrylamide-based compounds as a main component have been proposed in order to solve the problems of such cation-curable adhesives. However, although radical-curable adhesives having acryl amide-based compounds as a main component have a higher curing speed than cation-curable adhesives, they have problems in that curing speeds decrease, and adhesive strength is reduced under high humidity conditions. Meanwhile, a process of preparing a polarizing plate has high moisture content since the process includes a wet process in which swelling, dyeing, orientation and the like of polyvinyl alcohol films are carried out in an aqueous solution, and therefore, in order to use the acryl amide-based adhesive for a polarizing plate, the polarizer needs to be hot-air dried or go through additional processes such as surface treatment such as plasma before applying the adhesive.

Accordingly, the development of radical-curable adhesives in which a curing speed and adhesive strength are not reduced even in high humidity environments has been required so that the radical-curable adhesives may be used in a polarizing plate without a separate treatment.

DISCLOSURE

Technical Problem

In view of the above, an object of the present invention is to provide a radical-curable adhesive composition having excellent adhesive strength between a polarizer and a protective film, favorably maintaining this adhesive strength even in high humidity environments, and having excellent heat resistance, and a polarizing plate including the radical-curable adhesive composition.

Technical Solution

In one aspect, the present invention provide a radical-curable adhesive composition including a first compound represented by the following [Chemical Formula I]; a radical-curable second compound including at least one carboxyl group conjugated with a carbon-carbon unsaturated double bond present in the side chain in the molecule; and a radical initiator.

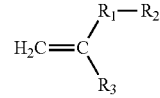

[Chemical Formula I]

In [Chemical Formula I], $R_1$ is an ester group or an ether group; $R_2$ is a $C_{1-10}$ alkyl group, a $C_{4-10}$ cycloalkyl group or a combination thereof, and herein, $R_2$ has at least one hydroxyl substituent in the molecule; and $R_3$ is hydrogen or a substituted or unsubstituted $C_{1-10}$ alkyl group.

Meanwhile, the second compound is preferably a compound represented by the following [Chemical Formula II].

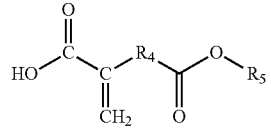

[Chemical Formula II]

In [Chemical Formula II], $R_4$ is a single bond, a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; and $R_5$ is hydrogen; or a substituted or unsubstituted $C_{1-10}$ alkyl group, a substituted or unsubstituted $C_{4-14}$ cycloalkyl group, a substituted or unsubstituted $C_{6-14}$ aryl group or a combination thereof.

Meanwhile, the radical-curable adhesive composition preferably includes the first compound in 40 to 90 parts by weight, the second compound in 1 to 50 parts by weight and the radical initiator in 0.5 to 10 parts by weight, with respect to 100 parts by weight of the radical-curable adhesive composition.

Meanwhile, the first compound may include one or more types of compounds selected from the group consisting of compounds represented by the following [Chemical Formula 1] to [Chemical Formula 8].

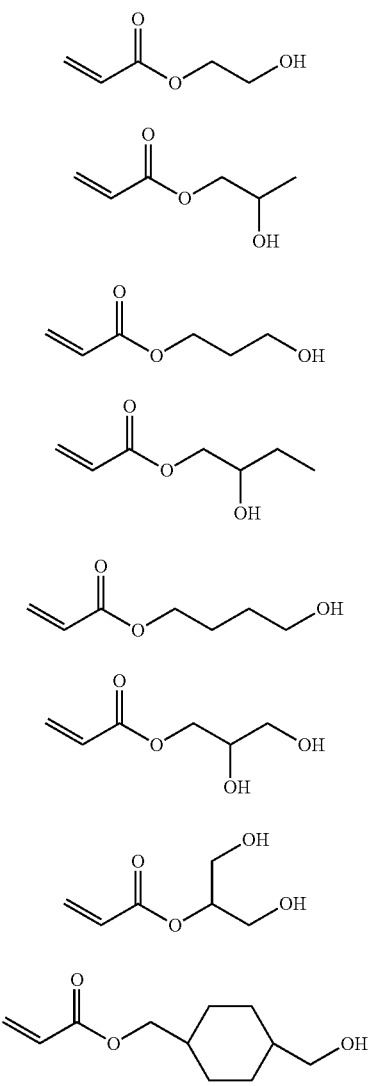

[Chemical Formula 1]

[Chemical Formula 2]

[Chemical Formula 3]

[Chemical Formula 4]

[Chemical Formula 5]

[Chemical Formula 6]

[Chemical Formula 7]

[Chemical Formula 8]

Meanwhile, the second compound may include one or more types of compounds selected from the group consisting of compounds represented by the following [Chemical Formula 9] to [Chemical Formula 13].

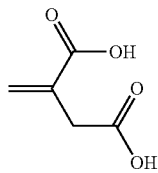

[Chemical Formula 9]

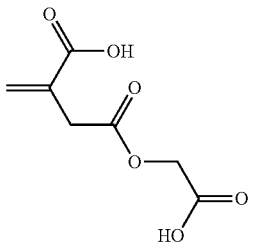

[Chemical Formula 10]

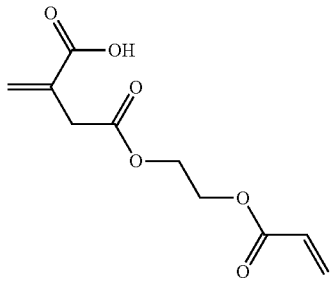

[Chemical Formula 11]

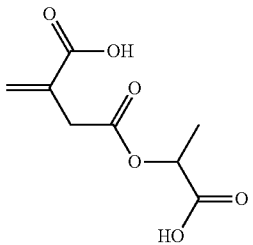

[Chemical Formula 12]

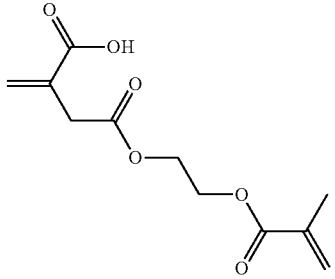

[Chemical Formula 13]

Meanwhile, the radical-curable adhesive composition may further include a third compound having an acid value of 100 to 1000 mg KOH/g.

Herein, the third compound may include one or more types of compounds selected from the group consisting of compounds represented by the following [Chemical Formula 14] to [Chemical Formula 25].

[Chemical Formula 14]
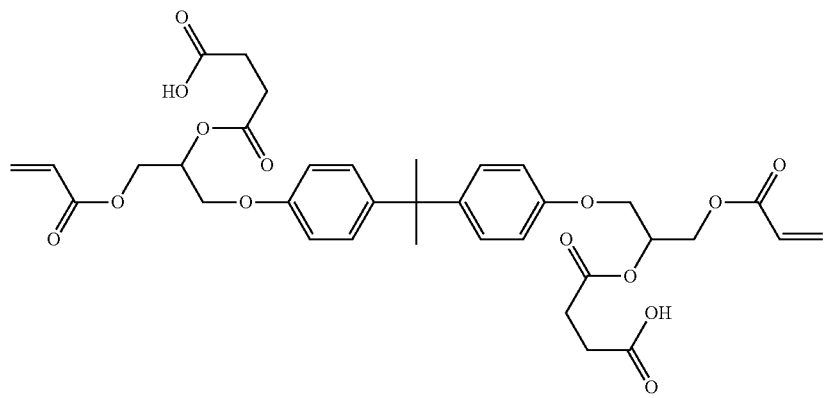
[Chemical Formula 15]
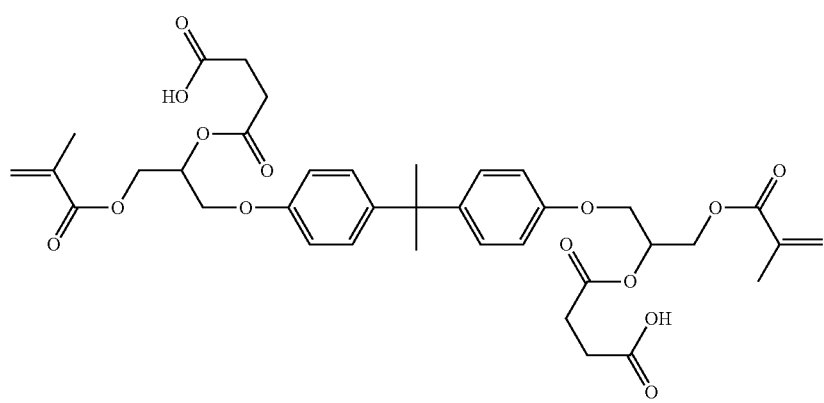
[Chemical Formula 16]
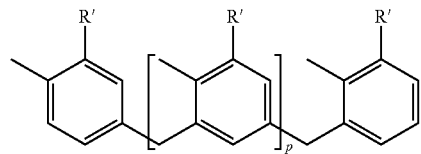
(herein, R′ is 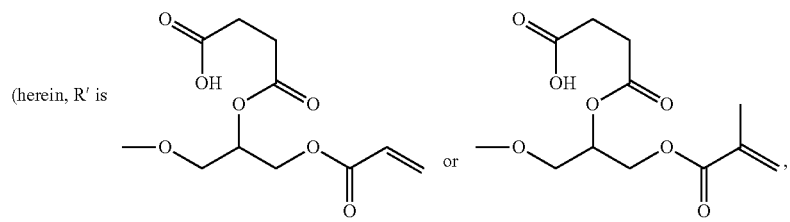
and p is an integer of 1 to 5)
[Chemical Formula 17]
[Chemical Formula 18]
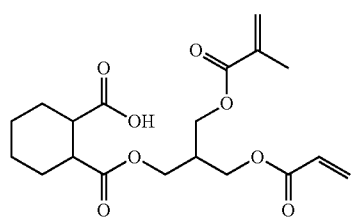
[Chemical Formula 19]
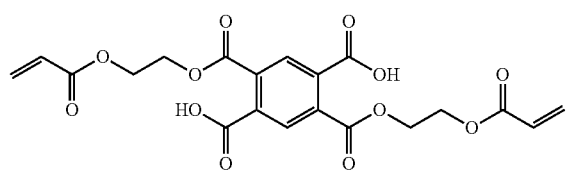

-continued

[Chemical Formula 20]

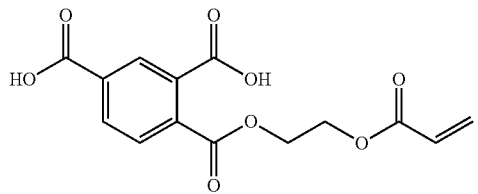

[Chemical Formula 21]

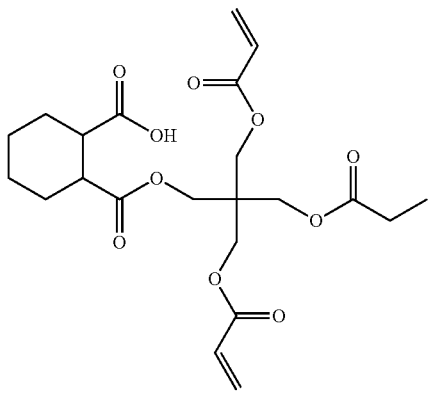

[Chemical Formula 22]

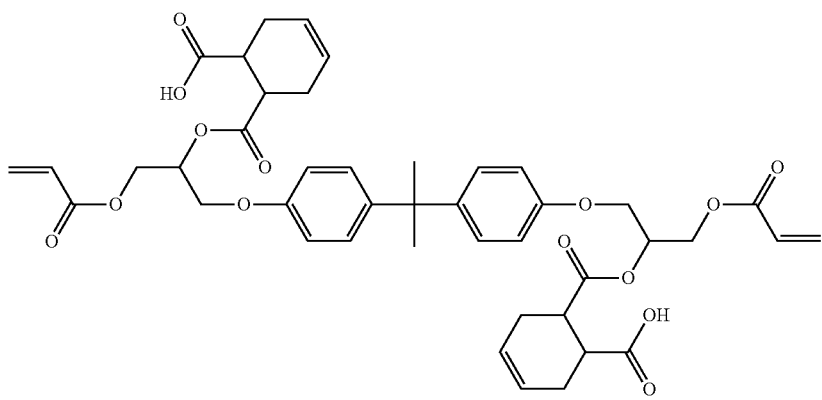

[Chemical Formula 23]

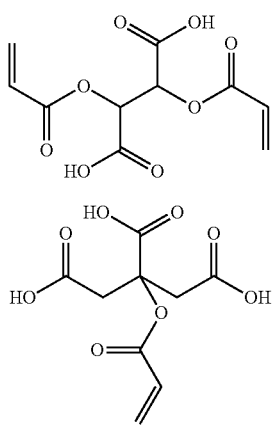

[Chemical Formula 24]

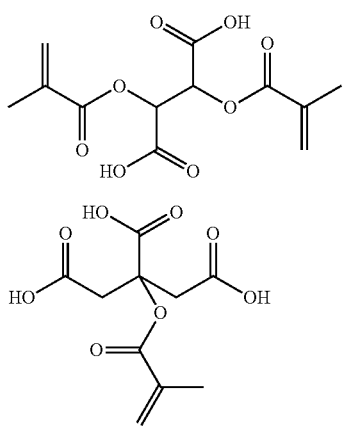

[Chemical Formula 25]

Herein, a content of the third compound is preferably 1 to 50 parts by weight with respect to 100 parts by weight of the radical-curable adhesive composition.

Meanwhile, the radical-curable adhesive composition may further include a photoacid generator.

Meanwhile, the radical-curable adhesive composition may further include a multifunctional (meth)acryl-based compound, a phosphate-based compound including at least one (meth)acrylic group in the molecule, or a combination thereof.

Alternatively, the radical-curable adhesive composition may further include an epoxy compound including at least one epoxy group in the molecule, and a photoacid generator.

Meanwhile, the radical-curable adhesive composition preferably has a glass transition temperature of 60° C. or higher after curing.

In addition, the radical-curable adhesive composition preferably has viscosity of 10 to 200 cP.

In another aspect, the present invention provides a polarizing plate including a polarizer; an adhesive layer formed on at least one surface of the polarizer; and a polarizer protective film formed on the adhesive layer, wherein the adhesive layer is formed using the radical-curable adhesive composition.

Herein, the polarizer is preferably a polyvinyl alcohol-based film in which iodine or dichroic dye is adsorbed and oriented.

Advantageous Effects

A radical-curable adhesive composition according to the present invention has excellent adhesive strength between a polarizer and a protective film even in high humidity environments, has a high curing speed and a high degree of curing, therefore, may be favorably used in between a polarizer having a high water content and a protective film.

In addition, a radical-curable adhesive composition according to the present invention has a high glass transition temperature, and therefore, has an advantage in that a polarizing plate prepared using the composition has excellent heat resistance.

Mode for Disclosure

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

1. Radical-Curable Adhesive Composition

As a result of extensive studies for developing a radical-curable adhesive composition capable of stably maintaining adhesive strength even in high humidity environments, the inventors of the present invention have found that, when a radical-curable compound including at least one carboxyl group conjugated with a carbon-carbon unsaturated double bond present in the side chain in the molecule is added to an acryl-based compound having a hydroxyl group, and the like, and the result is used as a radical-curable adhesive, adhesive strength is excellent even in high humidity environments, and completed the present invention.

More specifically, a radical-curable adhesive composition of the present invention includes a first compound represented by the following [Chemical Formula I]; a radical-curable second compound including at least one carboxyl group conjugated with a carbon-carbon unsaturated double bond present in the side chain in the molecule; and a radical initiator.

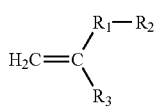

[Chemical Formula I]

In [Chemical Formula I], $R_1$ is an ester group or an ether group; $R_2$ is a $C_{1-10}$ alkyl group, a $C_{4-10}$ cycloalkyl group or a combination thereof, and herein, $R_2$ has at least one hydroxyl substituent in the molecule; and $R_3$ is hydrogen or a substituted or unsubstituted $C_{1-10}$ alkyl group.

More preferably, the radical-curable adhesive composition of the present invention may include the first compound in 40 to 90 parts by weight; the second compound in 1 to 50 parts by weight; and the radical initiator in 0.1 to 10 parts by weight, with respect to 100 parts by weight of the adhesive composition.

1-1. First Compound

First, the first compound is a component for obtaining adhesive strength of an adhesive using hydrogen bonding by a hydroxyl group, and various compounds represented by the following [Chemical Formula I] may be used.

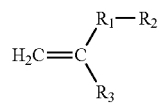

[Chemical Formula I]

In [Chemical Formula I], $R_1$ is an ester group or an ether group; $R_2$ is a $C_{1-10}$ alkyl group, a $C_{4-10}$ cycloalkyl group or a combination thereof, and herein, $R_2$ has at least one hydroxyl substituent in the molecule; and $R_3$ is hydrogen or a substituted or unsubstituted $C_{1-10}$ alkyl group.

Herein, in $R_2$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

In addition, in $R_2$, the cycloalkyl group means a nonaromatic monocyclic, bicyclic or tricyclic hydrocarbon part of 4 to 14, 4 to 10, or 4 to 6 ring carbons, and the cycloalkyl group in the present specification may include at least one unsaturated bond in the molecule. Meanwhile, examples of the cycloalkyl group may include, but are not limited to, a cyclopentane ring, a cyclohexane ring and the like.

Meanwhile, the hydroxyl group may substitute any position of the alkyl group or the cycloalkyl group. For example, the hydroxyl group may position at the end of the alkyl group, or in the middle of the alkyl group. Meanwhile, the rest of the hydrogen atoms included in the alkyl group or the cycloalkyl group may be substituted with any substituent.

In addition, in $R_3$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like. One or more hydrogen atoms included in the alkyl group may be substituted with any substituent.

In the present invention, examples of the first compound may include, but are not limited to, one or more types of compounds selected from the group consisting of compounds represented by the following [Chemical Formula 1] to [Chemical Formula 8].

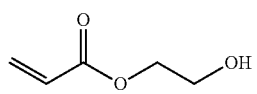

[Chemical Formula 1]

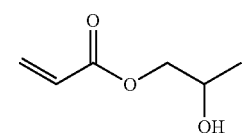

[Chemical Formula 2]

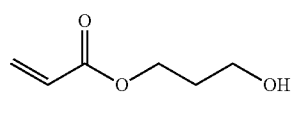

[Chemical Formula 3]

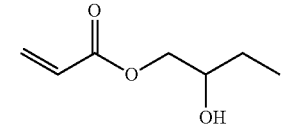

[Chemical Formula 4]

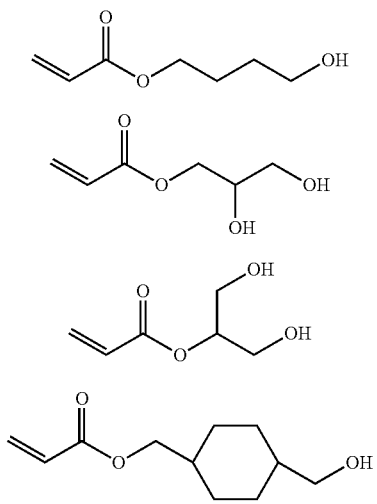

[Chemical Formula 5]

[Chemical Formula 6]

[Chemical Formula 7]

[Chemical Formula 8]

Meanwhile, the content of the first compound may be approximately 40 to 90 parts by weight, preferably approximately 50 to 80 parts by weight, and more preferably approximately 60 to 80 parts by weight, with respect to 100 parts by weight of the whole adhesive composition. When the content of the first compound is too low, adhesive strength is difficult to be secured, and when the content is too high, a glass transition temperature of the adhesive composition decreases leading to the reduction of heat resistance.

1-2. Second Compound

Next, the second compound is a component for securing excellent adhesive strength even in high humidity environments, and furthermore, for more enhancing heat resistance by increasing a glass transition temperature of the adhesive composition, and various radical-curable compounds including at least one carboxyl group in the molecule, including at least one carbon-carbon unsaturated double bond in the side chain, wherein the carboxyl group is conjugated with the carbon-carbon unsaturated double bond, may be used. Herein, the side chain means a hydrocarbon part branching from the main chain of the second compound.

Radical-curable adhesives generally secure adhesive strength through hydrogen bonding between the hydroxyl group of an adhesive and the hydroxyl group of a polarizer, however, in high humidity environments, the hydroxyl group of a polarizer forms hydrogen bonding with moisture instead of the hydroxyl group of an adhesive, which causes a problem of adhesive strength reduction. However, when the second compound described above is added together, the carboxyl group having a high moisture affinity bonds to moisture, thereby secures a hydrogen bonding site for a polarizer, and therefore, adhesive strength reduction may be prevented even in high humidity environments. In addition, excellent radical curing may be accomplished by a carbon-carbon double bond present in the side chain.

Meanwhile, in the present invention, the second compound is preferably, but not limited to, a compound represented by the following [Chemical Formula II]. In this case, excellent adhesive strength may be secured in high humidity environments particularly, and furthermore, heat resistance may be more enhanced by increasing a glass transition temperature of the adhesive composition.

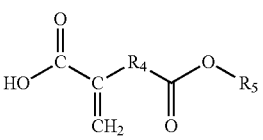

[Chemical Formula II]

In [Chemical Formula II], $R_4$ is a single bond, a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; and $R_5$ is hydrogen; or a substituted or unsubstituted $C_{1-10}$ alkyl group, a substituted or unsubstituted $C_{4-14}$ cycloalkyl group, a substituted or unsubstituted $C_{6-14}$ aryl group or a combination thereof.

Herein, in $R_4$, the alkylene group means a linear or branched divalent hydrocarbon part of 1 to 10, 1 to 8, or 1 to carbon atoms, and the alkylene group in the present specification may include at least one unsaturated bond in the molecule. Meanwhile, examples of the alkylene group may include, but are not limited to, methylene, ethylene, trimethylene, tetramethylene, pentamethylene, hexamethylene, heptamethylene, nonamethylene, decamethylene and the like. One or more hydrogen atoms included in the alkylene group may be substituted with any substituent.

In addition, in $R_4$, the cycloalkylene group means a nonaromatic divalent monocyclic, bicyclic or tricyclic hydrocarbon part of 4 to 14, 4 to 10, or 4 to 6 ring carbons, and the cycloalkylene group in the present specification may include at least one unsaturated bond in the molecule. Meanwhile, examples of the cycloalkylene group may include, but are not limited to, a divalent cyclopentane ring, a divalent cyclohexane ring and the like. One or more hydrogen atoms included in the cycloalkylene group may be substituted with any substituent.

Furthermore, in $R_4$, the arylene group means a divalent monocyclic, bicyclic or tricyclic aromatic hydrocarbon part having 6 to 14, or 6 to 12 ring carbons, and examples thereof may include, but are not limited to, a divalent benzene ring, a divalent naphthalene ring, a divalent anthracene ring, a divalent biphenyl ring and the like. One or more hydrogen atoms included in the arylene group may be substituted with any substituent.

Meanwhile, among the groups shown above, $R_4$ is, although not limited thereto, preferably a substituted or unsubstituted $C_{1-10}$ alkylene group, more preferably a substituted or unsubstituted $C_{1-8}$ alkylene group, and even more preferably a substituted or unsubstituted $C_{1-4}$ alkylene group.

In addition, in $R_5$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like. One or more hydrogen atoms included in the alkyl group may be substituted with any substituent, and for example, may be substituted with a carboxyl group, a (meth)acryloyl group or a (meth)acryloyloxy group.

Furthermore, in $R_5$, the cycloalkyl group means a nonaromatic monocyclic, bicyclic or tricyclic hydrocarbon part of 4 to 14, 4 to 10, or 4 to 6 ring carbons, and the cycloalkyl group in the present specification may include at least one unsaturated bond. Meanwhile, examples of the cycloalkyl group may include, but are not limited to, a cyclopentane ring, a cyclohexane ring and the like. One or more hydrogen atoms included in the cycloalkyl group may be substituted with any substituent, and for example, may be substituted with a carboxyl group, a (meth)acryloyl group or a (meth)acryloyloxy group.

In addition, in $R_5$, the aryl group means a monocyclic, bicyclic or tricyclic aromatic hydrocarbon part having 6 to 14, or 6 to 12 ring carbons, and examples thereof may include, but are not limited to, a benzene ring, a naphthalene ring, an anthracene ring, a biphenyl ring and the like. One or more hydrogen atoms included in the aryl group may be substituted with any substituent, and for example, may be substituted with a carboxyl group, a (meth)acryloyl group or a (meth)acryloyloxy group.

Meanwhile, $R_5$ is preferably, but not limited to, hydrogen or a substituted $C_{1-10}$ alkyl group, and herein, the substituent more is preferably a carboxyl group, a (meth)acryloyl group or a (meth)acryloyloxy group. Specifically, $R_5$ is more preferably hydrogen, a $C_{1-10}$ carboxyalkyl group, a $C_{1-10}$ (meth)acryloylalkyl group or a $C_{1-10}$ (meth)acryloyloxyalkyl group. Herein, the $C_{1-10}$ alkyl group of the $C_{1-10}$ carboxyalkyl group, the $C_{1-10}$ (meth)acryloylalkyl group or the $C_{1-10}$ (meth)acryloyloxyalkyl group may be a linear or branched hydrocarbon part of 1 to 10, 1 to 8, or 1 to 4 carbon atoms. In addition, the carboxyl group of the $C_{1-10}$ carboxyalkyl group may substitute any position of the alkyl group, the (meth)acryloyl group of the $C_{1-10}$ (meth)acryloylalkyl group may substitute any position of the alkyl group, and the (meth)acryloyloxy group of the $C_{1-10}$ (meth)acryloyloxyalkyl group may also substitute any position of the alkyl group.

More specifically, the second compound may include, but is not limited to, one or more types of compounds selected from the group consisting of compounds represented by the following [Chemical Formula 9] to [Chemical Formula 13].

[Chemical Formula 9]

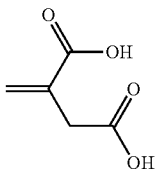

[Chemical Formula 10]

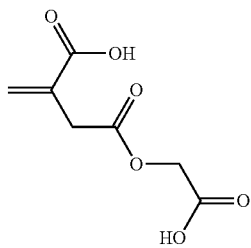

[Chemical Formula 11]

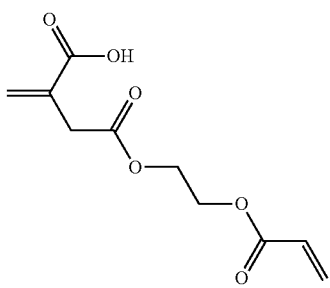

[Chemical Formula 12]

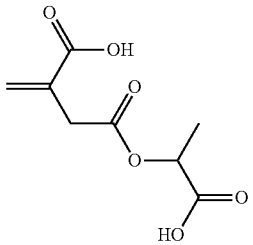

[Chemical Formula 13]

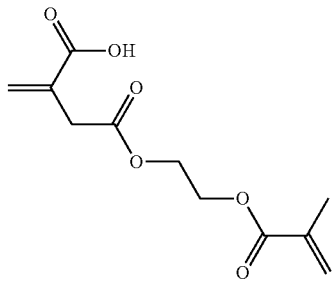

Meanwhile, the content of the second compound may be approximately 1 to 50 parts by weight, preferably approximately 1 to 40 parts by weight, and more preferably approximately 5 to 35 parts by weight, with respect to 100 parts by weight of the whole adhesive composition. When the content of the second compound is too low, adhesive strength is not secured in high humidity environments, and when the content is too high, storage stability becomes poor, and adhesive strength is reduced due to a high glass transition temperature.

1-3. Radical Initiator

Next, the radical initiator included in the radical-curable adhesive composition according to the present invention is for enhancing a curing speed by facilitating radical polymerization, and radical initiators generally used in the art may be used without limit as the radical initiator.

More specifically, examples of the radical initiator may include one or more types selected from the group consisting of 1-hydroxy-cyclohexyl-phenyl-ketone, 2-hydroxy-2-methyl-1-phenyl-1-propanone, 2-hydroxy-1-[4-(2-hydroxyethoxy) phenyl]-2-methyl-1-propanone, methyl benzoylformate, oxy-phenyl-acetic acid-2-[2 oxo-2phenyl-acetoxyethoxy]-ethyl ester, oxy-phenyl-acetic acid-2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide and phenylbis(2,4,6-trimethylbenzoyl)-phosphine oxide. In the present invention, phenylbis(2,4,6-trimethylbenzoyl)-phosphine oxide may be particularly preferably used.

Meanwhile, the content of the radical initiator may be preferably, for example, approximately 0.5 to 10 parts by weight, 1 to 5 parts by weight, or 2 to 3 parts by weight, with respect to 100 parts by weight of the radical-curable adhesive composition. When the content of the radical initiator satisfies the above range, curing of an adhesive may be smoothly accomplished.

1-4. Third Compound

Meanwhile, the radical-curable adhesive composition of the present invention may further include a third compound having an acid value of 100 to 1000 mg KOH/g as necessary.

When such a third compound having a high acid value is additionally included, a glass transition temperature of an adhesive may be further enhanced without reducing the adhesive strength of the adhesive, and therefore, more superior heat resistance may be secured. Herein, the acid value means a mg number of potassium hydroxide (KOH) required for completely neutralizing 1 g of a sample. Meanwhile, in the present specification, the third compound means compounds particularly excluding the second compound among compounds having an acid value of 100 to 1000 mg KOH/g.

Herein, the third compound may be used without limit as long as the compound has compatibility with the adhesive composition of the present invention, and has an acid value of 100 to 1000 mg KOH/g and more preferably 100 to 900 mg KOH/g or 200 to 900 mg KOH/g, and examples thereof may include, but are not limited to, one or more types of compounds selected from the group consisting of compounds represented by the following [Chemical Formula 14] to [Chemical Formula 25].

[Chemical Formula 14]

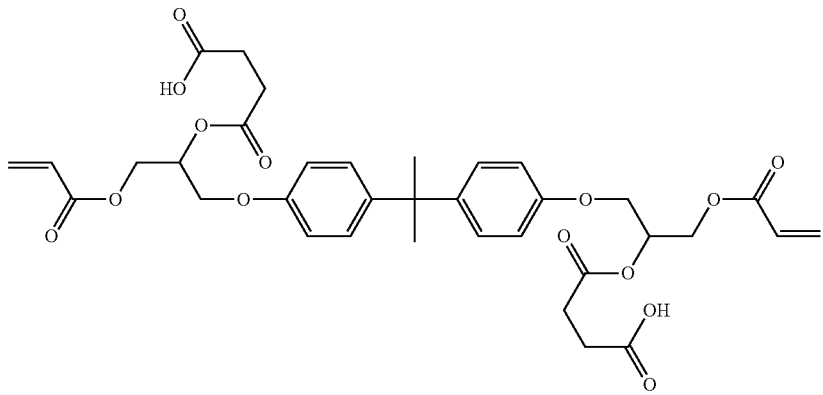

[Chemical Formula 15]

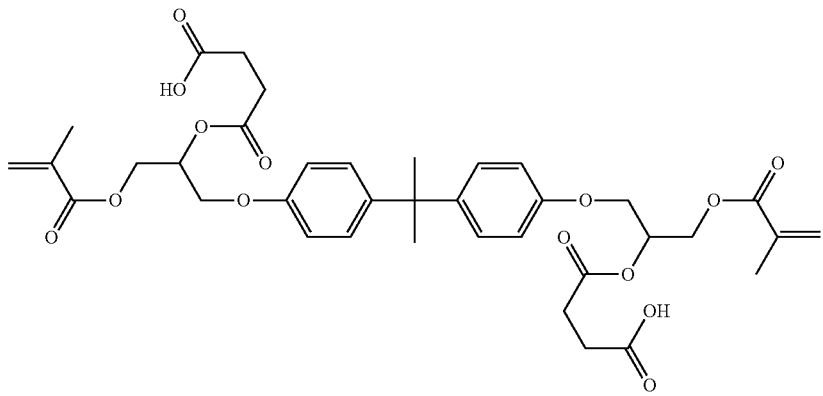

[Chemical Formula 16]

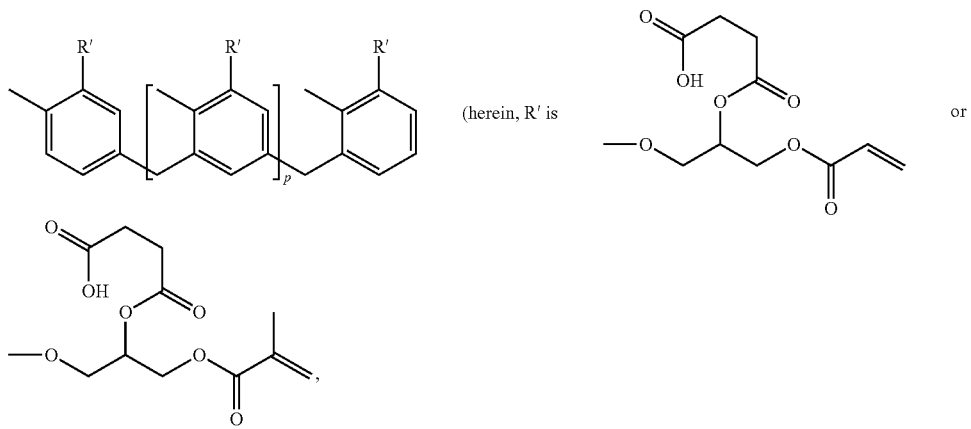

and p is an integer of 1 to 5)

[Chemical Formula 17]
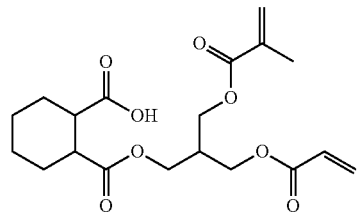
[Chemical Formula 18]
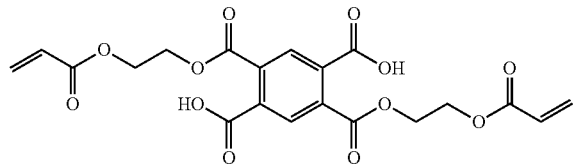
[Chemical Formula 19]
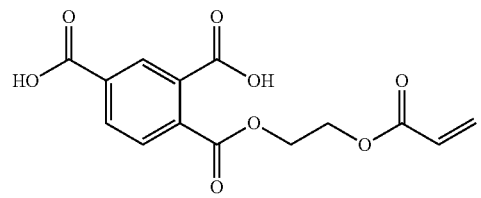
[Chemical Formula 20]
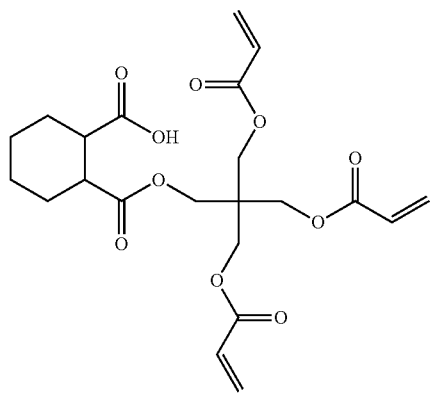
[Chemical Formula 21]
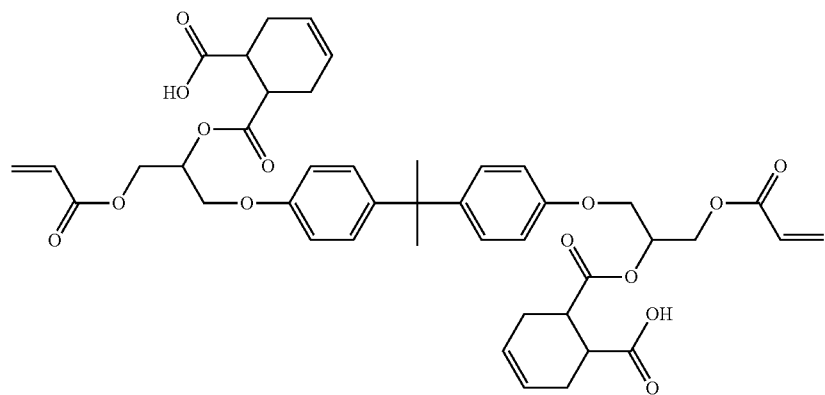
[Chemical Formula 22]
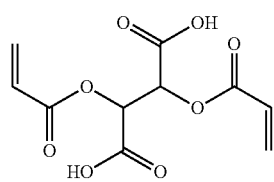
[Chemical Formula 23]
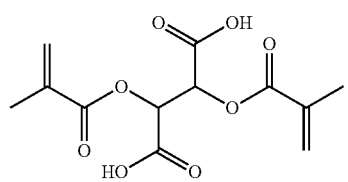
[Chemical Formula 24]
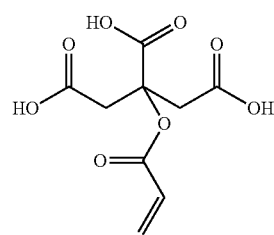
[Chemical Formula 25]
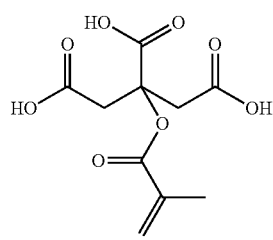

Herein, the content of the third compound may be 1 to 50 parts by weight, and preferably 5 to 50 parts by weight, or 10 to 40 parts by weight, with respect to 100 parts by weight of the radical-curable adhesive composition. When the content of the third compound satisfies the above range, a glass transition temperature may be raised without reducing adhesive strength.

1-5. Photoacid Generator

Meanwhile, the radical-curable adhesive composition of the present invention may further include a photoacid generator as necessary. A photoacid generator is a compound generating an acid (H+) by active energy rays, and when a photoacid generator is additionally included, an acid value of an adhesive may be adjusted through the photoacid generator, and there is an advantage in that adhesive strength may be more improved therethrough.

The photoacid generator capable of being used in the present invention preferably includes, for example, a sulfonium salt or an iodonium salt. Specific examples of the photoacid generator including a sulfonium salt or an iodonium salt may include one or more types selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl) phenyl]-iodonium hexafluorophosphate, (thiodi-4,1-phenylene)bis(diphenylsulfonium) dihexafluoroantimonate and (thiodi-4,1-phenylene)bis(diphenylsulfonium) dihexafluorophosphate, but are not limited thereto.

Meanwhile, the content of the photoacid generator may be 10 parts by weight or less, and preferably 0.1 to 10 parts by weight, 1 to 6 parts by weight, or 3 to 5 parts by weight, with respect to 100 parts by weight of the radical-curable adhesive composition. When the content of photoacid generator included in the radical-curable adhesive composition according to the present invention satisfies the above range, there is an advantage in that adhesive strength is more improved compared to cases in which the photoacid generator is not included, or the content of the photoacid generator does not satisfy the above range.

1-6. Additional Composition 1 for Improving Water Resistance

Meanwhile, the radical-curable adhesive composition of the present invention of the present invention may further include a multifunctional (meth)acryl-based compound, a phosphate-based compound including at least one (meth) acrylic group in the molecule, or a combination thereof for exhibiting stable physical properties even in high humidity environments by increasing the degree of cross-linkage in an adhesive layer and thereby improving water resistance.

For example, the radical-curable adhesive composition of the present invention may further include the first compound; the second compound; a multifunctional (meth) acryl-based compound and/or a phosphate-based compound including at least one (meth)acrylic group in the molecule; and the radical initiator.

Alternatively, the radical-curable adhesive composition of the present invention may include the first compound; the second compound; the third compound; a multifunctional (meth)acryl-based compound and/or a phosphate-based compound including at least one (meth)acrylic group in the molecule; and the radical initiator.

Herein, as the multifunctional (meth)acryl-based compound, various multifunctional (meth)acryl-based compounds widely known in the art may be used without limit. However, in the present specification, except for multifunctional (meth)acryl-based compounds listed below as examples, compounds corresponding to the first compound to the third compound described above, and compounds corresponding to the phosphate-based compound to be described later are not included in the multifunctional (meth)acryl-based compound.

In the present invention, examples of the multifunctional (meth)acryl-based compound may include ethylene glycol di(meth)acrylate, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth) acrylate, trimethylolpropane di(meth)acrylate, pentaerythritol di(meth)acrylate, ditrimethylolpropane di(meth)acrylate, diethylene glycol di(meth)acrylate, triethylene glycol di(meth)acrylate, dipropylene glycol di(meth)acrylate, tripropylene glycol di(meth)acrylate, polyethylene glycol di(meth) acrylate, polypropylene glycol di(meth)acrylate, polytetramethylene glycol di(meth)acrylate, silicone di(meth)acrylate, hydroxyl pivalic acid ester neopentyl glycol di(meth)acrylate, 2,2-bis[4-(meth)acryloyloxyethoxyethoxyphenyl]propane, 2,2-bis[4-(meth)acryloyloxyethoxyethoxycyclohexyl]propane, hydrogenated dicyclopentadienyl di(meth)acrylate, tricyclodecane dimethanol di(meth) acrylate, 1,3-dioxane-2,5-diyl di(meth)acrylate, di(meth) acrylate of 2-(2-hydroxy-1,1-dimethylethyl)-5-ethyl-5-hydroxymethyl-1,3-dioxane, tris(hydroxyethyl)isocyanurate di(meth)acrylate, glycerin tri(meth)acrylate, trimethylolpropane tri(meth)acrylate, ditrimethylolpropane tri(meth)acrylate, ditrimethylolpropane tetra(meth)acrylate, pentaerythritol tri(meth)acrylate, pentaerythritol tetra(meth)acrylate, dipentaerythritol tetra(meth)acrylate, dipentaerythritol penta (meth)acrylate, dipentaerythritol hexa(meth)acrylate, and the like. These may be used either alone or as a mixture thereof.

Meanwhile, although not limited thereto, examples of the multifunctional (meth)acryl-based compound more preferably include one or more types selected from the group consisting of compounds represented by the following [Chemical Formula III] to [Chemical Formula V]. In this case, water resistance improvement effect is particularly superior.

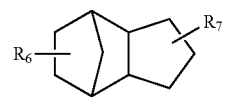

[Chemical Formula III]

In [Chemical Formula III], $R_6$ and $R_7$ are each independently a (meth)acryloyloxy group or a (meth)acryloyloxyalkyl group.

Herein, in $R_6$ and $R_7$, the alkyl of the (meth)acryloyloxyalkyl group means a linear or branched hydrocarbon part of 1 to 10, 1 to 8, or 1 to 4 carbon atoms, and the (meth) acryloyloxy group may substitute any position of the alkyl group. The rest one or more hydrogen atoms included in the alkyl may be substituted with any substituent.

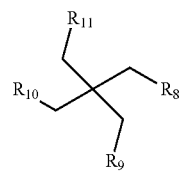

[Chemical Formula IV]

In [Chemical Formula IV], $R_8$, $R_9$ and $R_{10}$ are each independently a (meth)acryloyloxy group or a (meth)acryloyloxyalkyl group, and $R_{11}$ is a (meth)acryloyloxy group, a (meth)acryloyloxyalkyl group, a hydroxyl group or a substituted or unsubstituted $C_{1\text{-}10}$ alkyl group.

Herein, in $R_8$, $R_9$, $R_{10}$ and $R_{11}$, the alkyl of the (meth) acryloyloxyalkyl group means a linear or branched hydrocarbon part of 1 to 10, 1 to 8, or 1 to 4 carbon atoms, and the (meth)acryloyloxy group may substitute any position of the alkyl group. The rest one or more hydrogen atoms included in the alkyl may be substituted with any substituent.

In addition, in $R_{11}$, the alkyl group means a linear or branched hydrocarbon part of 1 to 10, 1 to 8, or 1 to 4 carbon atoms, and one or more hydrogen atoms included in the alkyl group may be substituted with any substituent.

[Chemical Formula V]

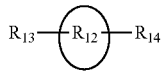

In [Chemical Formula V], $R_{12}$ is substituted or unsubstituted $C_{1\text{-}10}$ alkylene, and $R_{13}$ and $R_{14}$ are each independently a (meth)acryloyloxy group or a (meth)acryloyloxyalkyl group.

Herein, in $R_{12}$, the alkylene means a linear or branched divalent hydrocarbon part of 1 to 10, 1 to 8, or 1 to 6 carbon atoms, and the alkylene group in the present specification may include at least one unsaturated bond in the molecule. Meanwhile, examples of the alkylene group may include, but are not limited to, methylene, ethylene, trimethylene, tetramethylene, pentamethylene, hexamethylene, heptamethylene, nonamethylene, decamethylene and the like. One or more hydrogen atoms included in the alkylene may be substituted with any substituent.

In addition, in $R_{13}$ and $R_{14}$, the alkyl of the (meth)acryloyloxyalkyl group means a linear or branched hydrocarbon part of 1 to 10, 1 to 8, or 1 to 4 carbon atoms, and the (meth)acryloyloxy group may substitute any position of the alkyl group. The rest one or more hydrogen atoms included in the alkyl may be substituted with any substituent.

More specifically, examples of the multifunctional (meth) acryl-based compound may include, but are not limited to, one or more types of compounds selected from the group consisting of compounds represented by the following [Chemical Formula 26] to [Chemical Formula 29].

[Chemical Formula 26]

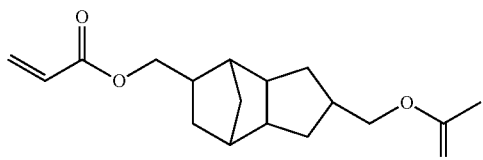

[Chemical Formula 27]

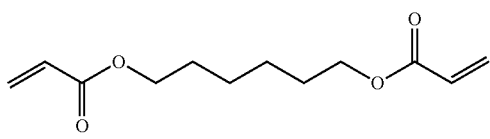

[Chemical Formula 28]

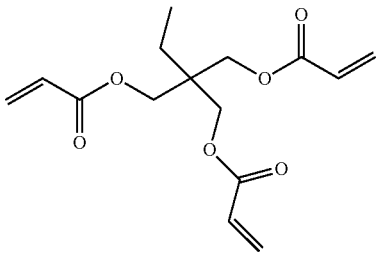

[Chemical Formula 29]

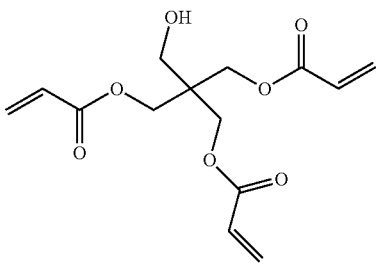

In addition, the phosphate-based compound including at least one (meth)acrylic group in the molecule may be used without limit as long as the compound is a phosphate-based compound including at least one (meth)acrylic group in the molecule. The phosphate-based compound including at least one (meth)acrylic group in the molecule may be, but is not limited to, a compound represented by the following [Chemical Formula VI]

[Chemical Formula VI]

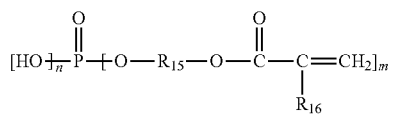

In [Chemical Formula VI], $R_{15}$ is a substituted or unsubstituted $C_{1\text{-}10}$ alkylene group, a substituted or unsubstituted $C_{4\text{-}14}$ cycloalkylene group, a substituted or unsubstituted $C_{6\text{-}14}$ arylene group or a combination thereof; $R_{16}$ is hydrogen or a methyl group; n is an integer of 0 to 2, m is an integer of 1 to 3, and n+m is 3.

Herein, in $R_{15}$, the alkylene group means a linear or branched divalent hydrocarbon part of 1 to 10, 1 to 8, or 1 to carbon atoms, and the alkylene group in the present specification may include at least one unsaturated bond in the molecule. Meanwhile, examples of the alkylene group may include, but are not limited to, methylene, ethylene, trimethylene, tetramethylene, pentamethylene, hexamethylene, heptamethylene, nonamethylene, decamethylene and the like. One or more hydrogen atoms included in the alkylene group may be substituted with any substituent.

In addition, in $R_{15}$, the cycloalkylene group means a nonaromatic divalent monocyclic, bicyclic or tricyclic hydrocarbon part of 4 to 14, 4 to 10, or 4 to 6 ring carbons, and the alkylene group in the present specification may include at least one unsaturated bond in the molecule. Meanwhile, examples of the cycloalkylene group may include, but are not limited to, a divalent cyclopentane ring, a divalent cyclohexane ring and the like. One or more hydrogen atoms included in the cycloalkylene group may be substituted with any substituent.

Furthermore, in $R_{15}$, the arylene group means a divalent monocyclic, bicyclic or tricyclic aromatic hydrocarbon part having 6 to 14, or 6 to 12 ring atoms, and examples thereof may include, but are not limited to, a divalent benzene ring, a divalent naphthalene ring, a divalent anthracene ring, a divalent biphenyl ring and the like. One or more hydrogen atoms included in the arylene group may be substituted with any substituent.

Meanwhile, among the groups shown above, $R_{15}$ is, although not limited thereto, preferably a substituted or unsubstituted $C_{1-10}$ alkylene group, more preferably a substituted or unsubstituted $C_{1-8}$ alkylene group, and even more preferably a substituted or unsubstituted $C_{1-4}$ alkylene group.

In addition, in n and m, it is more preferable that n be an integer of 1 or 2, m be an integer of 1 or 2 and n+m be 3, and it is particularly preferable that n be 2, m be 1 and n+m be 3.

More specifically, the phosphate-based compound including at least one (meth)acrylic group in the molecule may include, but is not limited to, one or more types of compounds selected from the group consisting of compounds represented by the following [Chemical Formula 30] to [Chemical Formula 35].

[Chemical Formula 30]

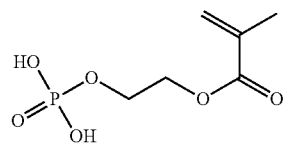

[Chemical Formula 31]

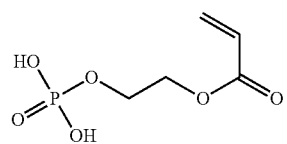

[Chemical Formula 32]

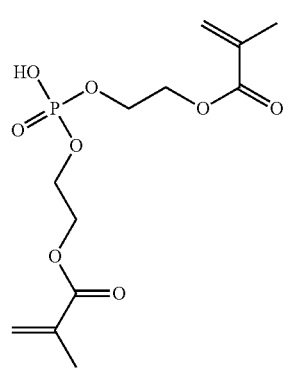

[Chemical Formula 33]

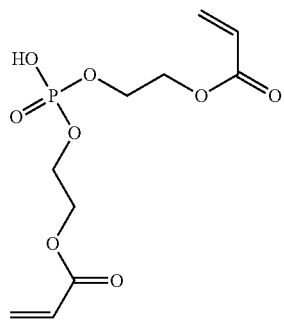

[Chemical Formula 34]

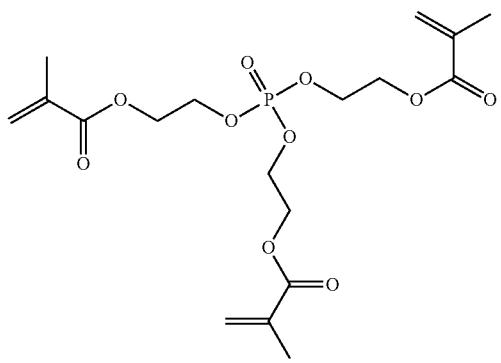

[Chemical Formula 35]

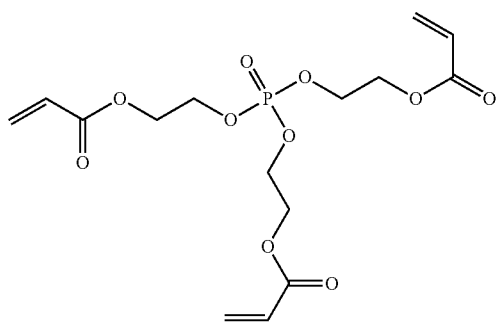

Meanwhile, the content of the multifunctional (meth) acryl-based compound may be approximately 4 to 50 parts by weight, preferably approximately 5 to 40 parts by weight, and more preferably approximately 10 to 40 parts by weight, with respect to 100 parts by weight of the whole radical-curable adhesive composition. When the content of the compound satisfies the above range, the radical-curable adhesive composition of the present invention may secure excellent adhesive strength and water resistance.

In addition, the content of the phosphate-based compound including at least one (meth)acrylic group in the molecule may be approximately 0.5 to 30 parts by weight, preferably approximately 0.5 to 20 parts by weight, and more preferably approximately 0.5 to 15 parts by weight, with respect to 100 parts by weight of the whole radical-curable adhesive composition. When the content of the compound satisfies the above range, the radical-curable adhesive composition of the present invention may secure excellent adhesive strength and water resistance.

1-7. Additional Composition 2 for Improving Water Resistance

Meanwhile, the radical-curable adhesive composition of the present invention may further include an epoxy compound including at least one epoxy group in the molecule and a photoacid generator for exhibiting stable physical properties even in high humidity environments by improving water resistance. Herein, the photoacid generator is the same as the photoacid generator described above.

For example, the radical-curable adhesive composition of the present invention may include the first compound; the second compound; an epoxy compound including at least one epoxy group in the molecule; the radical initiator; and a photoacid generator.

Alternatively, the radical-curable adhesive composition of the present invention may include the first compound; the second compound; the third compound; an epoxy compound including at least one epoxy group in the molecule; the radical initiator; and a photoacid generator.

Herein, the epoxy compound including at least one epoxy group in the molecule is not particularly limited as long as the compound has at least one epoxy group in the molecule, and examples thereof may include an aromatic epoxy-based compound, a hydrogenated epoxy-based compound, an alicyclic epoxy-based compound, an epoxy group-containing (meth)acryl-based compound and the like. These may be used either alone or as a mixture of two or more.

Herein, the aromatic epoxy-based compound means an epoxy-based compound including at least one aromatic hydrocarbon ring in the molecule, and examples thereof may include, but are not limited to, a bisphenol-type epoxy resin such as diglycidyl ether of bisphenol A, diglycidyl ether of bisphenol F and diglycidyl ether of bisphenol S; a novolac-type epoxy resin such as a phenol novolac epoxy resin, a cresol novolac epoxy resin and a hydroxybenzaldehyde phenol novolac epoxy resin; a multifunctional epoxy resin such as glycidyl ether of tetrahydroxyphenylmethane, glycidyl ether of tetrahydroxybenzophenone and epoxylated polyvinylphenol, and the like.

In addition, the hydrogenated epoxy-based compound means an epoxy-based compound obtained by selectively carrying out a hydrogenation reaction on the aromatic epoxy-based compound under pressure in the presence of a catalyst.

Furthermore, the alicyclic epoxy-based compound means an epoxy-based compound in which an epoxy group is formed between two adjacent carbon atoms forming an aliphatic hydrocarbon ring, and examples thereof may include, but are not limited to, 2-(3,4-epoxy)cyclohexyl-5,5-spiro-(3,4-epoxy)cyclohexane-m-dioxane, 3,4-epoxycyclohexylmethyl-3,4-epoxycyclohexane carboxylate, 3,4-epoxy-6-methylcyclohexylmethyl-3,4-epoxy-6-methylcyclohexane carboxylate, vinylcyclohexane dioxide, bis(3,4-epoxycyclohexylmethyl)adipate, bis(3,4-epoxy-6-methylcyclohexylmethyl)adipate, exo-exobis(2,3-epoxycyclopentyl)ether, endo-exobis(2,3-epoxycyclopentyl)ether, 2,2-bis[4-(2,3-epoxypropoxy)cyclohexyl]propane, 2,6-bis (2,3-epoxypropoxycyclohexyl-p-dioxane), 2,6-bis(2,3-epoxypropoxy)norbornene, limonene dioxide, 2,2-bis(3,4-epoxycyclohexyl)propane, dicyclopentadiene dioxide, 1,2-epoxy-6-(2,3-epoxypropoxy)hexahydro-4,7-methanoindane, p-(2,3-epoxy)cyclopentylphenyl-2,3-epoxypropylether, 1-(2,3-epoxypropoxy)phenyl-5,6-epoxyhexahydro-4,7-methanoindane, o-(2,3-epoxy) cyclopentylphenyl-2,3-epoxypropylether), 1,2-bis[5-(1,2-epoxy)-4,7-hexahydromethanoindanoxyl]ethane, cyclopentenyl phenyl glycidyl ether, methylenebis(3,4-epoxycyclohexane), ethylene glycol di(3,4-epoxycyclohexylmethyl)ether, ethylenebis(3,4-epoxycyclohexanecarboxylate) and the like.

In addition, the epoxy group-containing (meth)acryl-based compound means a compound including both an epoxy group and a (meth)acryloyloxy group in the molecule, and examples thereof may include, but are not limited to, glycidyl acrylate, 2-methylglycidyl acrylate, 3,4-epoxybutyl acrylate, 6,7-epoxyheptyl acrylate, 3,4-epoxycyclohexyl acrylate, glycidyl methacrylate, 2-methyl glycidyl methacrylate, 3,4-epoxybutyl methacrylate, 6,7-epoxyheptyl methacrylate, 3,4-epoxycyclohexyl methacrylate, 4-hydroxybutyl acrylate glycidyl ether and the like.

Meanwhile, the epoxy compound including at least one epoxy group in the molecule preferably includes one or more selected from the group consisting of an alicyclic epoxy-based compound and an epoxy group-containing (meth)acryl-based compound. Herein, among these, the alicyclic epoxy-based compound is particularly preferably an epoxy-based compound having at least two epoxy groups and at least two alicyclic rings in the molecule, for example, 3,4-epoxycyclohexylmethyl-3,4-epoxycyclohexane carboxylate and the like, and the epoxy group-containing (meth)acryl-based compound is particularly preferably a glycidyl (meth)acryl-based compound, for example, glycidyl acrylate, glycidyl methacrylate and the like. In this case, the water resistance improvement effect of the adhesive composition of the present invention is very superior.

Meanwhile, the content of the epoxy compound including at least one epoxy group in the molecule may be approximately 1 to 20 parts by weight, preferably approximately 1 to 15 parts by weight, and more preferably approximately 1 to 10 parts by weight, with respect to 100 parts by weight of the whole radical-curable adhesive composition. When the content of the compound satisfies the above range, the radical-curable adhesive composition of the present invention may secure excellent adhesive strength and water resistance.

1-8. Physical Properties of Radical-Curable Adhesive Composition

Meanwhile, the radical-curable adhesive composition according to the present invention preferably has a glass transition temperature of 60° C. or higher after curing, for example, 60 to 500° C. or 70 to 200° C. A polarizing plate prepared using the radical-curable adhesive composition according to the present invention having a glass transition temperature in the range described above has an advantage in that heat resistance is excellent.

In addition, the radical-curable adhesive composition according to the present invention preferably has viscosity of approximately 10 to 200 cP, or 20 to 100 cP. When the viscosity of the adhesive composition satisfies the above range, there is an advantage in that the adhesive layer may be formed to be thin, and workability is excellent due to low viscosity.

Furthermore, the radical-curable adhesive composition according to the present invention may have an adhesive layer thickness of approximately 0.1 to 20 μm, and preferably approximately 0.1 to 10 μm or 0.1 to 5 μm. When the adhesive layer is too thin, uniformity and adhesive strength of the adhesive layer may be reduced, and when the adhesive layer is too thick, there may be a problem of a polarizing plate exterior getting wrinkled.

The radical-curable adhesive composition of the present invention described above has excellent adhesive strength for films made of various materials, and in addition to this, maintains adhesive strength for a long period of time even in high humidity environments, and therefore, the radical-curable adhesive composition of the present invention may be favorably used for a polarizing plate. In addition, the radical-curable adhesive composition according to the present invention has a high curing speed and a high degree of curing, therefore, there is an advantage in that productivity may increase when a polarizing plate is prepared.

2. Polarizing Plate

Next, a polarizing plate according to the present invention will be described.

A polarizing plate of the present invention includes a polarizer; a radical-curable adhesive layer formed on at least one surface of the polarizer; and a protective film formed on the adhesive layer, wherein the adhesive layer is formed using the radical-curable adhesive composition of the present invention described above.

2-1. Polarizer

First, the polarizer is not particularly limited, and polarizers well known in the art, for example, films formed with polyvinyl alcohol (PVA) including iodine or dichroic dye may be used. The polarizer may be prepared by dyeing a PVA film with iodine or dichroic dye, however, the preparation method is not particularly limited. In the present specification, a polarizer means a state not including a protective film, and a polarizing plate means a state including a polarizer and a protective film.

2-2. Adhesive Layer

Next, the radical-curable adhesive layer is formed using the radical-curable adhesive composition according to the present invention described above, and may be formed using methods well known in the art. For example, a method of forming an adhesive layer by coating an adhesive composition on one surface of a protective film, laminating a polarizer and the protective film, and then curing the result through irradiating active energy rays such as ultraviolet rays, visible rays, an electron beam and X-rays may be used. Herein, the irradiation method is not particularly limited, and for example, a method of irradiating ultraviolet rays of approximately 10 to 2500 mJ/cm$^2$ with an ultraviolet ray irradiator (fusion lamp, D bulb) may be used.

2-3. Protective Film

Next, the protective film is used for supporting and protecting a polarizer, and protective films made of various materials generally known in the art, such as cellulose-based films, polyethylene terephthalate (PET) films, cycloolefin polymer (COP) films and acryl-based films, may be used without limit. Among these, using an acryl-based film is particularly preferable considering optical properties, durability, economic efficiency and the like.

Meanwhile, an acryl-based film capable of being used in the present invention may be obtained by extrusion molding materials to be molded including a (meth)acrylate-based resin as a main component. Herein, the (meth)acrylate-based resin is a material having a resin including a (meth)acrylate-based unit as a main component, and the concept also includes not only a homopolymer resin formed with a (meth)acrylate-based unit, but also a copolymer resin copolymerizing other monomer units in addition to a (meth)acrylate-based unit, and a blend resin blending other resins to such a (meth)acrylate-based resin.

Meanwhile, the (meth)acrylate-based unit may be, for example, an alkyl(meth)acrylate-based unit. Herein, the alkyl(meth)acrylate-based unit means both an alkylacrylate-based unit and an alkylmethacrylate-based unit, and the alkyl group of the alkyl(meth)acrylate-based unit preferably has a carbon number of 1 to 10, and more preferably has a carbon number of 1 to 4.

In addition, the monomer unit capable of being copolymerized with the (meth)acrylate-based unit may include a styrene-based unit, a maleic anhydride-based unit, a maleimide-based unit and the like. Herein, examples of the styrene-based unit may include, but are not limited to, styrene, a-methylstyrene and the like; examples of the maleic anhydride-based monomer may include, but are not limited to, maleic anhydride, methyl maleic anhydride, cyclohexyl maleic anhydride, phenyl maleic anhydride and the like; and examples of the maleimide-based monomer may include, but are not limited to, maleimide, N-methylmaleimide, N-cyclohexylmaleimide, N-phenylmaleimide and the like. These may be used either alone or as a mixture.

Meanwhile, the acryl-based film may be a film including a (meth)acrylate-based resin having a lactone ring structure. Specific examples of the (meth)acrylate-based resin having a lactone ring structure may include a (meth)acrylate-based resin having a lactone ring structure disclosed in Japanese Patent Application Laid-Open Publication No. 2000-230016, Japanese Patent Application Laid-Open Publication No. 2001-151814 and Japanese Patent Application Laid-Open Publication No. 2002-120326, and the like.

A method for preparing the acryl-based film is not particularly limited, and for example, the acryl-based film may be prepared by preparing a thermoplastic resin composition by sufficiently mixing a (meth)acrylate-based resin, other polymers, additives and the like using any proper mixing method, and then molding the result to a film, or the acryl-based film may be prepared by preparing a (meth)acrylate-based resin, other polymers, additives and the like as a separate solution, then forming a uniformly mixed solution by mixing the separately prepared solutions, and molding the result to a film. In addition, the acryl-based film may be any one of an unoriented film or an oriented film. When the acryl-based film is an oriented film, it may be either a monoaxially oriented film or a biaxially oriented film, and when the acryl-based film is a biaxially oriented film, it may be any one of a simultaneous biaxially oriented film or a sequential biaxially oriented film.

Meanwhile, the polarizing plate of the present invention may further include a primer layer in between the adhesive layer and the protective film for further improving adhesive strength. Herein, the primer layer may be formed using a method of applying a coating solution including a water dispersible polymer resin, water dispersible fine particles and water on the protective film using a bar coating method, a gravure coating method or the like, and drying the result. Examples of the water dispersible polymer resin may include a water dispersible polyurethane-based resin, a water dispersible acryl-based resin, a water dispersible polyester-based resin or a combination thereof, and as the water dispersible fine particles, inorganic-based fine particles such as silica, titania, alumina and zirconia, organic-based fine particles formed with a silicone-based resin, a fluorine-based resin, a (meth)acryl-based resin, a cross-linked polyvinyl alcohol and a melamine-based resin, or a combination thereof, may be used, but the examples are not limited thereto.

3. Optical Device

Such a polarizing plate described above may be favorably used for optical devices such as liquid crystal display devices. Examples of the optical device may include a liquid crystal display device including a liquid crystal panel, and polarizing plates each provided on both surfaces of this liquid crystal panel, and herein, at least one of the polarizing plates may be the polarizing plate according to the present invention. Herein, the types of the liquid crystal panel included in the liquid crystal display device are not particularly limited. For example, known panels including panels using a passive matrix methods such as a twisted nematic (TN) type, a super twisted nematic (STN) type, a ferroelectric (F) type or a polymer dispersed (PD) type; panels using an active matrix methods such as a two terminal type or a three terminal type; and an in plane switching (IPS) panel and a vertical alignment (VA) type panel may all be used without being limited by the types. In addition, types of other constitutions forming a liquid crystal display device such as upper and lower substrates (ex. color filter substrate or array substrate) are not particularly limited as well, and constitutions known in the art may be employed without limit.

Hereinafter, the present invention will be described in more detail with reference to specific examples.

Preparation Example 1—Preparation of Acryl-Based Protective Film

Raw material pellets were prepared by supplying a resin composition obtained by uniformly mixing poly(N-cyclohexylmaleimide-co-methylmethacrylate), a styrene-maleic anhydride copolymer resin and a phenoxy-based resin in a weight ratio of 100:2.5:5 to a 24 ϕ extruder substituted with nitrogen from a raw material hopper to an extruder, and melting the result at 250° C.

As the phenoxy-based resin, PKFE (Mw=60,000, Mn=16,000, Tg=95° C.) manufactured by InChem Corporation was used. As the styrene-maleic anhydride copolymer resin, Dylaeck 332 that is 85% by weight of styrene and 15% by weight of anhydrous maleic anhydride was used, and as the poly(N-cyclohexylmaleimide-co-methylmethacrylate) resin, a compound having the N-cyclohexylmaleimide content in 6.5% by weight when analyzed using an NMR was used.

The obtained raw material pellets were vacuum dried, were melted at 260° C. using an extruder, then passed through a coat-hanger-type T-die, and then passed through a chrome plating casting roll and a drying roll, and as a result, a film having a thickness of 150 μm was prepared. An acrylic film was prepared by orienting this film to a percentage of 170% in an MD direction at 125° C. using the speed difference of the rolls with a pilot orientation apparatus.

The acrylic film prepared through the process described above was corona treated, and a primer composition, in which 20 parts by weight of an oxazoline cross-linking agent (manufactured by Nippon Shokubai Co. Ltd., WS700) was added to a primer composition having a solid content of 10% by weight prepared by diluting CK-PUD-F (urethane dispersion manufactured by Chokwang Paint Ltd.) with pure water, was coated on one surface of the acrylic film using a #7 bar, and the result was oriented to a percentage of 190% in a TD direction at 130° C. using a tenter, and finally, an acryl-based protective film having a primer layer thickness of 400 nm was prepared.

Preparation Example 2—Preparation of Adhesive Composition (1) Adhesive Composition A Adhesive Composition A was prepared by adding 3 parts by weight of phenylbis(2,4,6-trimethyl)benzoyl-phosphine oxide, a radical initiator, to 100 parts by weight of an adhesive composition including 2-hydroxyethyl acrylate in 70 parts by weight, itaconic acid in 10 parts by weight, and 4,4'-((((propane-2,2-diylbis(4,1-phenylene))bis(oxy))bis(1-(methacryloyloxy)propane-3,2-diyl))bis(oxy))bis(4-oxobutanoic acid) in 20 parts by weight.

(2) Adhesive Composition B

Adhesive Composition B was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 70 parts by weight, itaconic acid in 10 parts by weight, and 4,4'-((((propane-2,2-diylbis(4,1-phenylene))bis(oxy))bis(1-(methacryloyloxy)propane-3,2-diyl))bis(oxy))bis(4-oxobutanoic acid) in 20 parts by weight.

(3) Adhesive Composition C

Adhesive Composition C was prepared by adding 3 parts by weight of phenylbis(2,4,6-trimethyl)benzoyl-phosphine oxide, a radical initiator, to 100 parts by weight of an adhesive composition including 2-hydroxyethyl acrylate in 70 parts by weight, itaconic acid in 20 parts by weight, and 4,4'-((((propane-2,2-diylbis(4,1-phenylene))bis(oxy))bis(1-(methacryloyloxy)propane-3,2-diyl))bis(oxy))bis(4-oxobutanoic acid) in 10 parts by weight.

(4) Adhesive Composition D

Adhesive Composition D was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 70 parts by weight, itaconic acid in 20 parts by weight, and 4,4'-((((propane-2,2-diylbis(4,1-phenylene))bis(oxy))bis(1-(methacryloyloxy)propane-3,2-diyl))bis(oxy))bis(4-oxobutanoic acid) in 10 parts by weight.

(5) Adhesive Composition E

Adhesive Composition E was prepared by adding 3 parts by weight of phenylbis(2,4,6-trimethyl)benzoyl-phosphine oxide, a radical initiator, to 100 parts by weight of an adhesive composition including 2-hydroxyethyl acrylate in 68 parts by weight, 4-(carboxymethoxy)-2-methylene-4-oxobutanoic acid in 20 parts by weight, and 4-(2-(acryloyloxy)ethoxy)-2-methylene-4-oxobutanoic acid in 12 parts by weight.

(6) Adhesive Composition F

Adhesive Composition F was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 68 parts by weight, 4-(carboxymethoxy)-2-methylene-4-oxobutanoic acid in 20 parts by weight, and 4-(2-(acryloyloxy)ethoxy)-2-methylene-4-oxobutanoic acid in 12 parts by weight.

(7) Adhesive Composition G

Adhesive Composition G was prepared by adding 3 parts by weight of phenylbis(2,4,6-trimethyl)benzoyl-phosphine oxide, a radical initiator, to 100 parts by weight of an adhesive composition including 2-hydroxyethyl acrylate in 60 parts by weight, 4-(carboxymethoxy)-2-methylene-4-oxobutanoic acid in 25 parts by weight, and 4-(2-(acryloyloxy)ethoxy)-2-methylene-4-oxobutanoic acid in 15 parts by weight.

(8) Adhesive Composition H

Adhesive Composition H was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 60 parts by weight, 4-(carboxymethoxy)-2-methylene-4-oxobutanoic acid in 25 parts by weight, and 4-(2-(acryloyloxy)ethoxy)-2-methylene-4-oxobutanoic acid in 15 parts by weight.

(9) Adhesive Composition I

Adhesive Composition I was prepared by adding 3 parts by weight of phenylbis(2,4,6-trimethyl)benzoyl-phosphine oxide, a radical initiator, to 100 parts by weight of an adhesive composition including 2-hydroxypropyl acrylate in 70 parts by weight, itaconic acid in 10 parts by weight, and 4,4'-(((((propane-2,2-diylbis(4,1-phenylene))bis(oxy))bis(1-(methacryloyloxy)propane-3,2-diyl))bis(oxy))bis(4-oxobutanoic acid) in 20 parts by weight.

(10) Adhesive Composition J

Adhesive Composition J was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxypropyl acrylate in 70 parts by weight, itaconic acid in 10 parts by weight, and 4,4'-(((((propane-2,2-diylbis(4,1-phenylene))bis(oxy))bis(1-(methacryloyloxy)propane-3,2-diyl))bis(oxy))bis(4-oxobutanoic acid) in 20 parts by weight.

(11) Adhesive Composition K

Adhesive Composition K was prepared by adding 3 parts by weight of phenylbis(2,4,6-trimethyl)benzoyl-phosphine oxide, a radical initiator, to 100 parts by weight of an adhesive composition including 4-hydroxybutyl acrylate in 60 parts by weight, itaconic acid in 10 parts by weight, and 4,4'-(((((propane-2,2-diylbis(4,1-phenylene))bis(oxy))bis(1-(methacryloyloxy)propane-3,2-diyl))bis(oxy))bis(4-oxobutanoic acid) in 30 parts by weight.

(12) Adhesive Composition L

Adhesive Composition L was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 4-hydroxybutyl acrylate in 60 parts by weight, itaconic acid in 10 parts by weight, and 4,4'-(((((propane-2,2-diylbis(4,1-phenylene))bis(oxy))bis(1-(methacryloyloxy)propane-3,2-diyl))bis(oxy))bis(4-oxobutanoic acid) in 30 parts by weight.

(13) Adhesive Composition M

Adhesive Composition M was prepared by adding 3 parts by weight of phenylbis(2,4,6-trimethyl)benzoyl-phosphine oxide, a radical initiator, to 100 parts by weight of an adhesive composition including 2-hydroxymethyl acrylate in 70 parts by weight, itaconic acid in 10 parts by weight, and 4-((1-(5-(3-(2-((2-carboxypropanoyl)oxy)-3-(methacryloyloxy)propoxy)-2-methylbenzyl)-3-(3-(2-((3-carboxypropanoyl)oxy)3-(methacryloyloxypropoxy)-4-methylbenzyl)-2-methylphenoxy)-3-(methacryloyloxy)propan-2-yl)oxy)-4-oxobutanoic acid in 20 parts by weight.

(14) Adhesive Composition N

Adhesive Composition N was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 70 parts by weight, itaconic acid in 10 parts by weight, and 4-((1-(5-(3-(2-((2-carboxypropanoyl)oxy)-3-(methacryloyloxy)propoxy)-2-methylbenzyl)-3-(3-(2-((3-carboxypropanoyl)oxy)3-(methacryloyloxypropoxy)-4-methylbenzyl)-2-methylphenoxy)-3-(methacryloyloxy)propan-2-yl)oxy)-4-oxobutanoic acid in 20 parts by weight.

(15) Adhesive Composition O

Adhesive Composition O was prepared by adding 3 parts by weight of phenylbis(2,4,6-trimethyl)benzoyl-phosphine oxide, a radical initiator, to 100 parts by weight of an adhesive composition including 2-hydroxyethyl acrylate in 70 parts by weight, itaconic acid in 10 parts by weight, and 6,6-(((((propane-2,2-diylbis(4,1-phenylene))bis(oxy))bis(1-(acryloyloxy)propane-3,2-diyl))bis(oxy))bis(carbonyl))bis(cyclohex-3-enecarboxylic acid) in 20 parts by weight.

(16) Adhesive Composition P

Adhesive Composition P was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 70 parts by weight, itaconic acid in 10 parts by weight, and 6,6-(((((propane-2,2-diylbis(4,1-phenylene))bis(oxy))bis(1-(acryloyloxy)propane-3,2-diyl))bis(oxy))bis(carbonyl))bis(cyclohex-3-enecarboxylic acid) in 20 parts by weight.

(17) Adhesive Composition Q

Adhesive Composition Q was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 70 parts by weight, and 4,4'-((((propane-2,2-diylbis(4,1-phenylene))bis(oxy))bis(1-(methacryloyloxy)propane-3,2-diyl))bis(oxy))bis(4-oxobutanoic acid) in 30 parts by weight.

(18) Adhesive Composition R

Adhesive Composition R was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 50 parts by weight, and 4,4'-((((propane-2,2-diylbis(4,1-phenylene))bis(oxy))bis(1-(methacryloyloxy)propane-3,2-diyl))bis(oxy))bis(4-oxobutanoic acid) in 50 parts by weight.

(19) Adhesive Composition S

Adhesive Composition S was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 70 parts by weight, maleic acid in 10 parts by weight, and 4,4'-((((propane-2,2-diylbis(4,1-phenylene))bis(oxy))bis(1-(methacryloyloxy)propane-3,2-diyl))bis(oxy))bis(4-oxobutanoic acid) in 20 parts by weight.

(20) Adhesive Composition T

Adhesive Composition T was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 70 parts by weight, isobornyl acrylate in 10 parts by weight, and 4,4'-((((propane-2,2-diylbis(4,1-phenylene))bis(oxy))bis(1-(methacryloyloxy)propane-3,2-diyl))bis(oxy))bis(4-oxobutanoic acid) in 20 parts by weight.

Specific structures of the compounds used in Adhesive Compositions A to T are as shown in the following [Table 1].

TABLE 1

| Name | Structure |
| --- | --- |
| 2-Hydroxyethyl Acrylate | |
| 2-Hydroxypropyl Acrylate | |
| 4-Hydroxybutyl Acrylate | |
| Itaconic Acid | |
| 4-(Carboxymethoxy)-2-methylene-4-oxobutanoic Acid | |
| 4-(2-(Acryloyloxy)ethoxy)-2-methylene-4-oxobutanoic Acid | |
| 4,4'-(((((Propane-2,2-diylbis(4,1-phenylene))bis(oxy))bis(1-(methacryloyloxy)propane-3,2-diyl))bis(oxy))bis(4-oxobutanoic acid) | |

TABLE 1-continued

| Name | Structure |
|---|---|
| 6,6-(((((Propane-2,2-diylbis(4,1-phenylene))bis(oxy))bis(1-(acryloyloxy)propane-3,2-diyl))bis(oxy))bis(carbonyl))bis(cyclohex-3-enecarboxylic acid) | 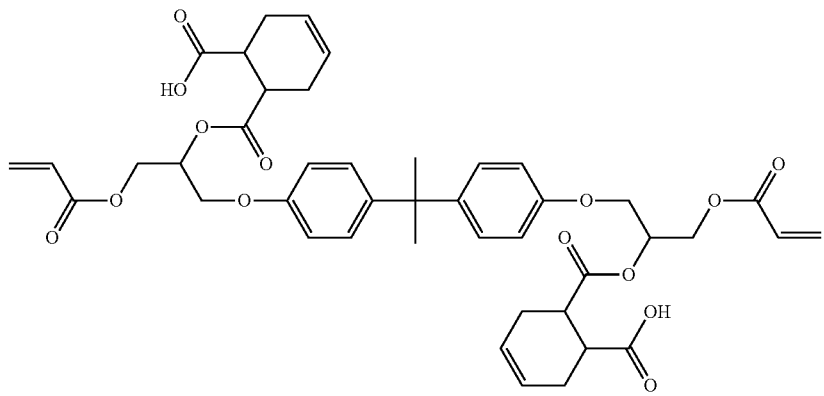 |
| 4-((1-(5-(3-(2-((2-Carboxypropanoyl)oxy)-3-(methacryloyloxy)propoxy)-2-methylbenzyl)-3-(3-(2-((3-carboxypropanoyl)oxy)3-(methacryloyloxy-propoxy)-4-methylbenzyl)-2-methylphenoxy)-3-(methacryloyloxy)propan-2-yl)oxy)-4-oxobutanoic acid | 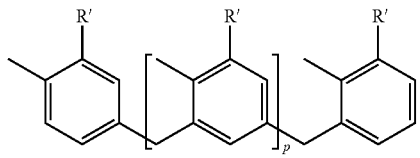 (herein, R' is 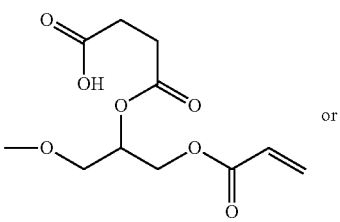 or 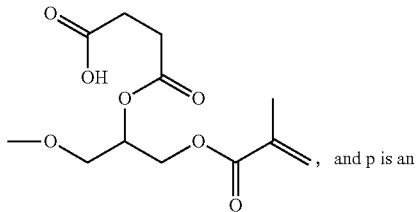, and p is an integer of 1 to 5) |
| Maleic acid | 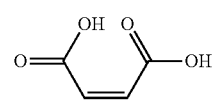 |
| Isobornyl Acrylate | 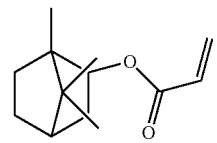 |

Example 1

The Adhesive Composition A was applied on the primer layer of the acrylic film-based protective film prepared in Preparation Example 1 using a dropping pipette, and the result was laminated on both surfaces of a polarizer (PVA element), and then the result passed through a laminator after setting the condition of the adhesive layer to have a final thickness of 1 to 2 μm. Next, ultraviolet rays of 900 mJ/cm$^2$ irradiated on the surface laminated with the acrylic film using a UV irradiator (fusion lamp, D bulb), and as a result, a polarizing plate was prepared. The polarizing plate was prepared in a constant temperature and constant humidity environment of a temperature of 20° C. and humidity of 50%.

Example 2

A polarizing plate was prepared in the same manner as in Example 1 except that Adhesive Composition B was used instead of Adhesive Composition A.

Example 3

A polarizing plate was prepared in the same manner as in Example 1 except that Adhesive Composition C was used instead of Adhesive Composition A.

Example 4

A polarizing plate was prepared in the same manner as in Example 1 except that Adhesive Composition D was used instead of Adhesive Composition A.

Example 5

A polarizing plate was prepared in the same manner as in Example 1 except that Adhesive Composition E was used instead of Adhesive Composition A.

Example 6

A polarizing plate was prepared in the same manner as in Example 1 except that Adhesive Composition F was used instead of Adhesive Composition A.

Example 7

A polarizing plate was prepared in the same manner as in Example 1 except that Adhesive Composition G was used instead of Adhesive Composition A.

Example 8

A polarizing plate was prepared in the same manner as in Example 1 except that Adhesive Composition H was used instead of Adhesive Composition A.

Example 9

A polarizing plate was prepared in the same manner as in Example 1 except that Adhesive Composition I was used instead of Adhesive Composition A.

Example 10

A polarizing plate was prepared in the same manner as in Example 1 except that Adhesive Composition J was used instead of Adhesive Composition A.

Example 11

A polarizing plate was prepared in the same manner as in Example 1 except that Adhesive Composition K was used instead of Adhesive Composition A.

Example 12

A polarizing plate was prepared in the same manner as in Example 1 except that Adhesive Composition L was used instead of Adhesive Composition A.

Example 13

A polarizing plate was prepared in the same manner as in Example 1 except that Adhesive Composition M was used instead of Adhesive Composition A.

Example 14

A polarizing plate was prepared in the same manner as in Example 1 except that Adhesive Composition N was used instead of Adhesive Composition A.

Example 15

A polarizing plate was prepared in the same manner as in Example 1 except that Adhesive Composition O was used instead of Adhesive Composition A.

Example 16

A polarizing plate was prepared in the same manner as in Example 1 except that Adhesive Composition P was used instead of Adhesive Composition A.

Comparative Example 1

A polarizing plate was prepared in the same manner as in Example 1 except that Adhesive Composition Q was used instead of Adhesive Composition A.

Comparative Example 2

A polarizing plate was prepared in the same manner as in Example 1 except that Adhesive Composition R was used instead of Adhesive Composition A.

Comparative Example 3

A polarizing plate was prepared in the same manner as in Example 1 except that Adhesive Composition S was used instead of Adhesive Composition A.

Comparative Example 4

A polarizing plate was prepared in the same manner as in Example 1 except that Adhesive Composition T was used instead of Adhesive Composition A.

Test Example 1—Evaluation on Peel Strength of Polarizing Plate

Peel strength of the polarizing plate prepared in Examples 1 to 16 and Comparative Examples 1 to 4 was measured, and shown in the following [Table 2]. Specifically, the polarizing plate prepared in 1 to 16 and Comparative Examples 1 to 4 was left unattended for 4 days under a condition of a temperature of 20° C. and humidity of 70%, then cut into pieces having a width of 20 mm, and a length of 100 mm, and the peel strength of the polarizer and the protective film was measured at a speed of 300 m/min and 90 degrees using a texture analyzer apparatus (TA-XT Plus manufactured by Stable Micro Systems, Ltd.). Herein, the peel strength of greater than 2.5 N/cm was marked as excellent, the peel strength of 1.5 N/cm to 2.5 N/cm was marked as fair, and the peel strength of less than 1.5 N/cm was marked as poor.

Test Example 2—Glass Transition Temperature Measurement of Adhesive Layer

A glass transition temperature of the adhesive layer of the polarizing plate prepared in Examples 1 to 16 and Comparative Examples 1 to 4 was measured, and shown in the following [Table 2]. Specifically, after the adhesive layer of the polarizing plate prepared under the curing condition described above was separated, the temperature was raised to −30 to 200° C. using a differential scanning calorimetry (DSC, manufactured by Mettler-Toledo International, Inc.), and the glass transition temperature was measured at the second run.

Test Example 3—Viscosity Measurement of Adhesive Composition

Viscosity of the adhesive composition used in Examples 1 to 16 and Comparative Examples 1 to 4 was measured at 25° C. using a Viscometer TV-22 (manufactured by TOKI SANGYO Co. Ltd.), and shown in the following [Table 2].

TABLE 2

| Category | Adhesive Composition | Peel Strength | Tg (° C.) | Viscosity (cP) |
|---|---|---|---|---|
| Example 1 | A | Excellent | 78 | 41 |
| Example 2 | B | Excellent | 82 | 40 |
| Example 3 | C | Excellent | 110 | 60 |
| Example 4 | D | Excellent | 112 | 60 |
| Example 5 | E | Excellent | 83 | 30 |
| Example 6 | F | Excellent | 99 | 29 |
| Example 7 | G | Excellent | 103 | 49 |
| Example 8 | H | Excellent | 124 | 48 |
| Example 9 | I | Fair | 85 | 45 |
| Example 10 | J | Fair | 88 | 44 |
| Example 11 | K | Fair | 60 | 60 |
| Example 12 | L | Fair | 64 | 62 |
| Example 13 | M | Fair | 65 | 56 |
| Example 14 | N | Fair | 68 | 54 |
| Example 15 | O | Excellent | 74 | 55 |
| Example 16 | P | Excellent | 78 | 52 |
| Comparative Example 1 | Q | Excellent | 45 | 25 |
| Comparative Example 2 | R | Poor | 80 | 170 |
| Comparative Example 3 | S | Poor | 50 | 39 |
| Comparative Example 4 | T | Poor | 46 | 21 |

As shown in [Table 2], it was seen that the polarizing plate of Examples 1 to 16 prepared using Adhesive Compositions A to P of the present invention had excellent adhesive strength even in high humidity environments, and had excellent heat resistance such that the adhesive layer had a high glass transition temperature.

However, it was seen that, in the polarizing plate using Adhesive Composition Q that does not include the second compound as in Comparative Example 1, adhesive strength was able to be improved by adding the first compound in large quantities, however, heat resistance was not favorable such that the glass transition temperature was low.

In addition, it was seen that, in the polarizing plate prepared using Adhesive Composition R that does not include the second compound as in Comparative Example 2, the glass transition temperature was able to be raised by adding the third compound in large quantities, however, adhesive strength was poor.

Furthermore, it was seen that the polarizing plate prepared using Adhesive Composition S as in Comparative Example included maleic acid having a similar structure with the second compound, however, due to the low reactivity of maleic acid for radical curing, adhesive strength was poor, and furthermore, the glass transition temperature was low as well.

In addition, it was seen that, although the polarizing plate prepared using Adhesive Composition T as in Comparative Example 4 included isobornyl acrylate, adhesive strength was poor since the second compound was not included, and the glass transition temperature was low as well.

Preparation Example 3—Preparation of Adhesive Composition (1) Adhesive Composition U Adhesive Composition U was prepared by adding 3 parts by weight of phenylbis(2,4,6-trimethyl)benzoyl-phosphine oxide, a radical initiator, to 100 parts by weight of an adhesive composition including 2-hydroxyethyl acrylate in 58 parts by weight, itaconic acid in 8 parts by weight, 4,4'-((((propane-2,2-diylbis(4,1-phenylene))bis(oxy))bis(1-(methacryloyloxy)propane-3,2-diyl))bis(oxy))bis(4-oxobutanoic acid) in 17 parts by weight, and dimethylol tricyclodecane diacrylate in 17 parts by weight.

(2) Adhesive Composition V

Adhesive Composition V was prepared by adding 3 parts by weight of phenylbis(2,4,6-trimethyl)benzoyl-phosphine oxide, a radical initiator, to 100 parts by weight of an adhesive composition including 2-hydroxyethyl acrylate in 68 parts by weight, itaconic acid in 9 parts by weight, 4,4'-((((propane-2,2-diylbis(4,1-phenylene))bis(oxy))bis(1-(methacryloyloxy)propane-3,2-diyl))bis(oxy))bis(4-oxobutanoic acid) in 19 parts by weight, and 2-(methacryloyloxyethyl)phosphate in 4 parts by weight.

(3) Adhesive Composition W

Adhesive Composition W was prepared by adding 3 parts by weight of phenylbis(2,4,6-trimethyl)benzoyl-phosphine oxide, a radical initiator, to 100 parts by weight of an adhesive composition including 2-hydroxyethyl acrylate in 56 parts by weight, 4-(carboxymethoxy)-2-methylene-4-oxobutanoic acid in 17 parts by weight, 4-(2-(acryloyloxy)ethoxy)-2-methylene-4-oxobutanoic acid in 10 parts by weight, and dimethylol tricyclodecane diacrylate in 17 parts by weight.

(4) Adhesive Composition X

Adhesive Composition X was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 66 parts by weight, 4-(carboxymethoxy)-2-methylene-4-oxobutanoic acid in 19 parts by weight, 4-(2-(acryloyloxy)ethoxy)-2-methylene-4-oxobutanoic acid in 11 parts by weight, and 2-(methacryloyloxyethyl)phosphate in 4 parts by weight.

(5) Adhesive Composition Y

Adhesive Composition Y was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 58 parts by weight, itaconic acid in 8 parts by weight, 4,4'-((((propane-2,2-diylbis(4,1-phenylene))bis(oxy))bis(1-(methacryloyloxy)propane-3,2-diyl))bis(oxy))bis(4-oxobutanoic acid) in 17 parts by weight, and glycidyl methacrylate in 17 parts by weight.

(6) Adhesive Composition Z

Adhesive Composition Z was prepared by adding 3 parts by weight of phenylbis(2,4,6-trimethyl)benzoyl-phosphine oxide, a radical initiator, and 5 parts by weight of diphenyl (4-phenylthio)phenylsulfonium hexafluorophosphate, a photoacid generator, to 100 parts by weight of an adhesive composition including 2-hydroxyethyl acrylate in 57 parts by weight, 4-(carboxymethoxy)-2-methylene-4-oxobutanoic acid in 17 parts by weight, 4-(2-(acryloyloxy) ethoxy)-2-methylene-4-oxobutanoic acid in 9 parts by weight, and glycidyl methacrylate in 17 parts by weight.

Specific structures of the compounds additionally used in Adhesive Compositions U to Z are as shown in the following [Table 3].

TABLE 3

| Name | Structure |
|---|---|
| Dimethylol Tricyclodecane Diacrylate | |
| 2-(Methacryloyl-oxyethyl) phosphate | |
| Glycidyl Methacrylate | |

Example 17

A polarizing plate was prepared in the same manner as in Example 1 except that Adhesive Composition U was used instead of Adhesive Composition A.

Example 18

A polarizing plate was prepared in the same manner as in Example 1 except that Adhesive Composition V was used instead of Adhesive Composition A.

Example 19

A polarizing plate was prepared in the same manner as in Example 1 except that Adhesive Composition W was used instead of Adhesive Composition A.

Example 20

A polarizing plate was prepared in the same manner as in Example 1 except that Adhesive Composition X was used instead of Adhesive Composition A.

Example 21

A polarizing plate was prepared in the same manner as in Example 1 except that Adhesive Composition Y was used instead of Adhesive Composition A.

Example 22

A polarizing plate was prepared in the same manner as in Example 1 except that Adhesive Composition Z was used instead of Adhesive Composition A.

Test Example 4—Evaluation on Water Resistance of Polarizing Plate

Water resistance of the polarizing plate prepared in Examples 17 to 22 was measured and shown in the following [Table 4]. Specifically, the polarizing plate of Examples 17 to 22 was laminated on a glass substrate, and then immersed in a thermostat at 60° C., and water resistance was determined after hours by the discoloration of the end of the polarizing plate, and when there was no deformation, it was marked as excellent, when there was also no discoloration, it was marked as fair, and when there was discoloration, it was marked as poor. Meanwhile, methods for measuring peel strength a glass transition temperature, and viscosity additionally listed in the following Table 4 are the same as those described above.

TABLE 4

| Category | Adhesive Composition | Water Resistance | Peel Strength | Tg (° C.) | Viscosity (cP) |
|---|---|---|---|---|---|
| Example 17 | U | Excellent | Excellent | 95 | 54 |
| Example 18 | V | Excellent | Excellent | 96 | 42 |
| Example 19 | W | Excellent | Excellent | 100 | 45 |
| Example 20 | X | Excellent | Excellent | 101 | 31 |
| Example 21 | Y | Excellent | Fair | 100 | 32 |
| Example 22 | Z | Excellent | Fair | 105 | 24 |

As shown in Table 4, it was seen that, when the multi-functional (meth)acryl-based compound and/or the phosphate-based compound were further included in the adhesive composition, or the epoxy compound and the photoacid generator were further included, water resistance was also very superior.

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:
1. A radical-curable adhesive composition comprising:
a first compound represented by the following;
a radical-curable second compound represented by the following [Chemical Formula II];
a third compound having an acid value of 100 to 1000 mg KOH/g, wherein the third compound is a compound excluding the second compound having an acid value of 100 to 1000 mg KOH/g; and a radical initiator:

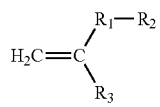
[Chemical Formula I]

wherein, in [Chemical Formula I], $R_1$ is an ester group or an ether group; $R_2$ is a $C_{1-10}$ alkyl group, a $C_{4-10}$ cycloalkyl group or a combination thereof, and herein, $R_2$ has at least one hydroxyl substituent in the molecule; and $R_3$ is hydrogen or a substituted or unsubstituted $C_{1-10}$ alkyl group,

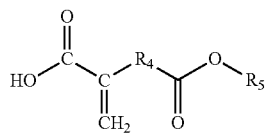
[Chemical Formula II]

wherein, in [Chemical Formula II], $R_4$ is a single bond, a substituted or unsubstituted $C_{1-10}$ alkylene group, a substituted or unsubstituted $C_{4-14}$ cycloalkylene group, a substituted or unsubstituted $C_{6-14}$ arylene group or a combination thereof; $R_5$ is hydrogen; or a substituted or unsubstituted $C_{1-10}$ alkyl group, a substituted or unsubstituted $C_{4-14}$ cycloalkyl group, a substituted or unsubstituted $C_{6-14}$ aryl group or a combination thereof.

2. The radical-curable adhesive composition of claim 1, comprising:
the first compound in 40 to 90 parts by weight;
the second compound in 1 to 50 parts by weight; and
the radical initiator in 0.5 to 10 parts by weight, with respect to 100 parts by weight of the radical-curable adhesive composition.

3. The radical-curable adhesive composition of claim 1, wherein the first compound includes one or more types selected from the group consisting of compounds represented by the following [Chemical Formula 1] to [Chemical Formula 8]:

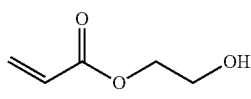
[Chemical Formula 1]

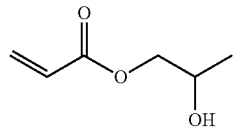
[Chemical Formula 2]

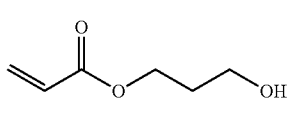
[Chemical Formula 3]

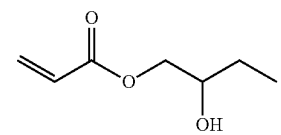
[Chemical Formula 4]

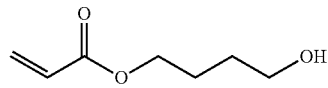
[Chemical Formula 5]

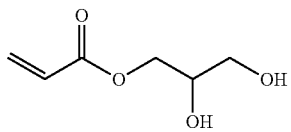
[Chemical Formula 6]

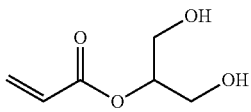
[Chemical Formula 7]

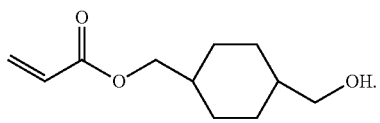
[Chemical Formula 8]

4. The radical-curable adhesive composition of claim 1, wherein the second compound includes one or more types selected from the group consisting of compounds represented by the following [Chemical Formula 9] to [Chemical Formula 13]:

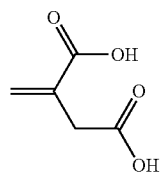
[Chemical Formula 9]

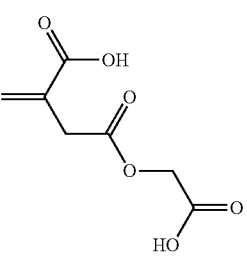
[Chemical Formula 10]

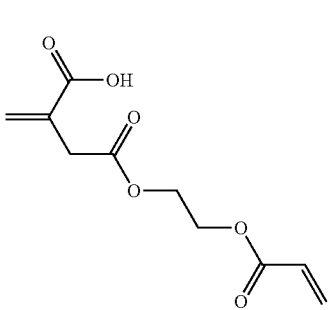 [SMILES: C=CC(=O)OCCOC(=O)CC(=C)C(=O)O]
[Chemical Formula 11]

[Chemical Formula 12]
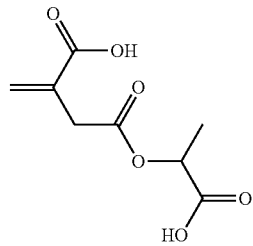
[Chemical Formula 13]
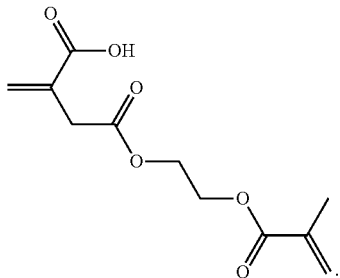
5. The radical-curable adhesive composition of claim 1, wherein the third compound includes one or more types selected from the group consisting of compounds represented by the following [Chemical Formula 14] to [Chemical Formula 25]:
[Chemical Formula 14]
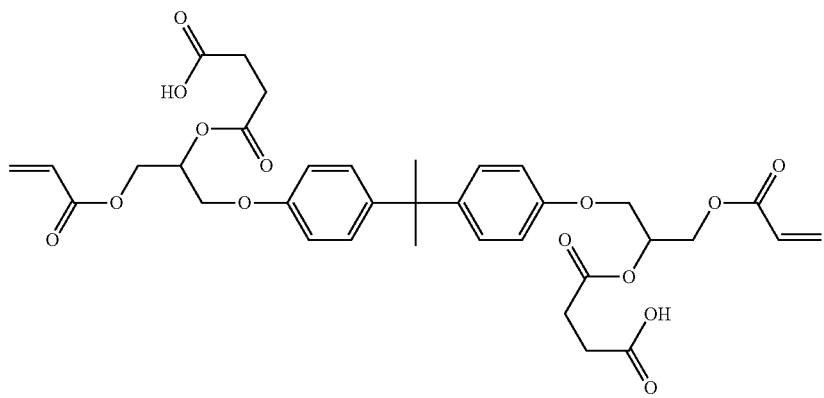 [SMILES: C=CC(=O)OCC(COc1ccc(C(C)(C)c2ccc(OCC(COC(=O)C=C)OC(=O)CCC(=O)O)cc2)cc1)OC(=O)CCC(=O)O]
[Chemical Formula 15]
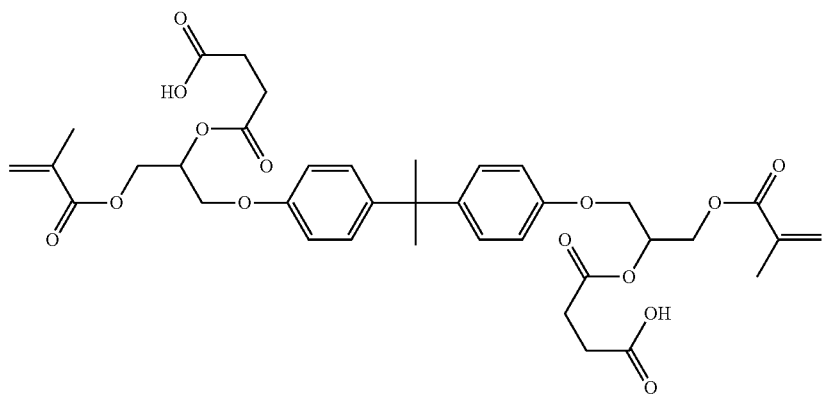

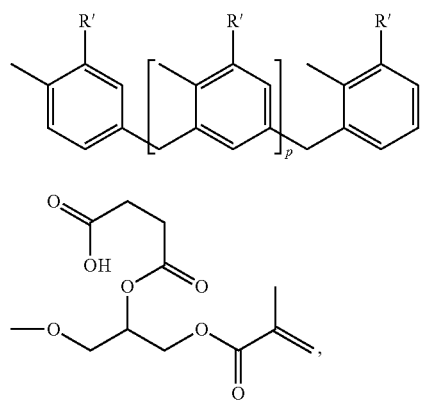
(herein, R' is
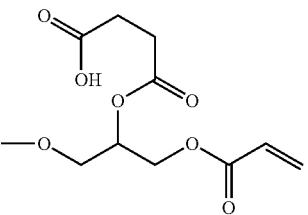 or
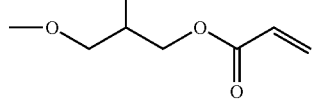
and p is an integer of 1 to 5)
[Chemical Formula 16]
[Chemical Formula 17]
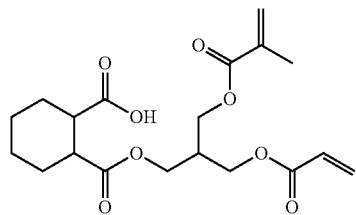
[Chemical Formula 18]
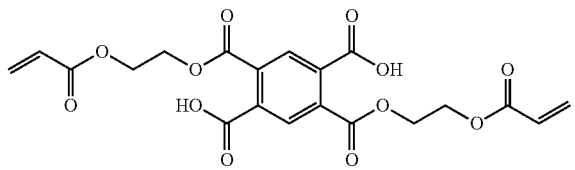
[Chemical Formula 19]
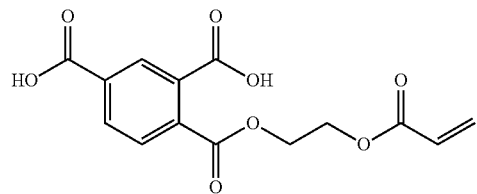
[Chemical Formula 20]
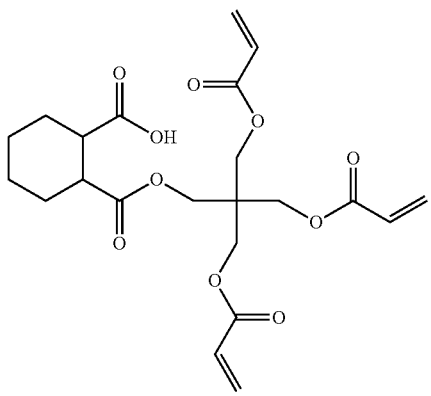
[Chemical Formula 21]
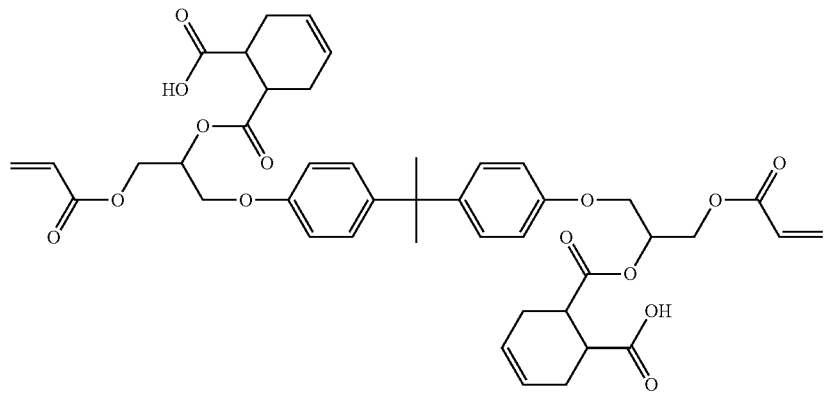 [SMILES: C=CC(=O)OCC(COc1ccc(C(C)(C)c2ccc(OCC(COC(=O)C=C)OC(=O)C3CC=CCC3C(=O)O)cc2)cc1)OC(=O)C1CC=CCC1C(=O)O]

[Chemical Formula 22]

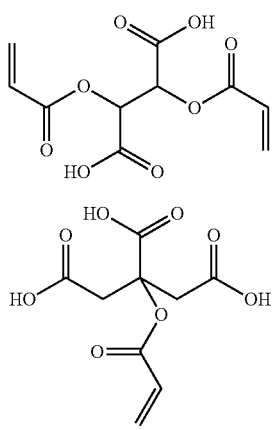

[Chemical Formula 23]

[Chemical Formula 24]

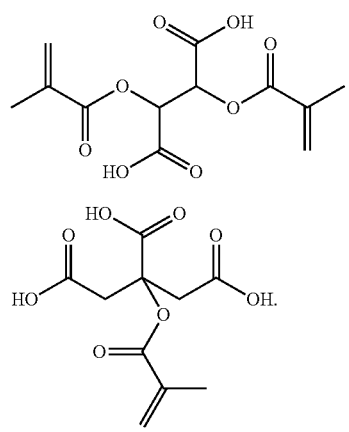

[Chemical Formula 25]

6. The radical-curable adhesive composition of claim 1, wherein a content of the third compound is 1 to 50 parts by weight with respect to 100 parts by weight of the radical-curable adhesive composition.

7. The radical-curable adhesive composition of claim 1 further comprising a photoacid generator.

8. The radical-curable adhesive composition of claim 1, further comprising:
   a multifunctional (meth)acryl-based compound;
   a phosphate-based compound including at least one (meth)acrylic group in the molecule; or
   a combination thereof.

9. The radical-curable adhesive composition of claim 1, further comprising:
   an epoxy compound including at least one epoxy group in the molecule; and
   a photoacid generator.

10. The radical-curable adhesive composition of claim 1, which has a glass transition temperature of 60° C. or higher after curing.

11. The radical-curable adhesive composition of claim 1, which has viscosity of 10 to 200 cP.

12. A polarizing plate comprising:
    a polarizer;
    an adhesive layer formed on at least one surface of the polarizer; and
    a polarizer protective film formed on the adhesive layer,
    wherein the adhesive layer is formed using the radical-curable adhesive composition of claim 1.

13. The polarizing plate of claim 12, which is a polyvinyl alcohol-based film in which iodine or dichroic dye is adsorbed and oriented.

* * * * *